United States Patent
Schurmann

(10) Patent No.: US 7,024,277 B2
(45) Date of Patent: Apr. 4, 2006

(54) DETERMINATION AND CONTROL OF ACTIVITIES OF AN EMOTIONAL SYSTEM

(76) Inventor: Alfred Schurmann, Postfach 1332, D-76443 Durmersheim (DE)

( * ) Notice: Subject to any disclaimer, the term of this patent is extended or adjusted under 35 U.S.C. 154(b) by 424 days.

(21) Appl. No.: 10/363,157

(22) PCT Filed: Nov. 11, 2002

(86) PCT No.: PCT/DE02/04172

§ 371 (c)(1),
(2), (4) Date: Mar. 6, 2003

(87) PCT Pub. No.: WO2004/044837

PCT Pub. Date: May 27, 2004

(65) Prior Publication Data

US 2004/0093121 A1 May 13, 2004

(30) Foreign Application Priority Data

Nov. 11, 2002 (DE) ................ PCT/DE02/04172

(51) Int. Cl.
*G06F 19/00* (2006.01)

(52) U.S. Cl. ............ 700/245; 700/246; 700/248; 700/257; 700/258; 700/259; 700/260; 700/264; 318/568.1; 318/568.11; 318/568.12; 318/568.2; 318/569; 901/1; 901/15

(58) Field of Classification Search ......... 700/245–246, 700/248, 257–260, 264, 253; 318/568.1, 318/568.11, 568.12, 568.2, 569; 704/31, 704/207, 509, 270; 901/1, 15; 701/23
See application file for complete search history.

(56) References Cited

U.S. PATENT DOCUMENTS

| | | | |
|---|---|---|---|
| 6,347,261 B1 * | 2/2002 | Sakaue et al. | 700/245 |
| 6,470,235 B1 * | 10/2002 | Kasuga et al. | 700/246 |
| 6,493,606 B1 * | 12/2002 | Saijo et al. | 700/245 |
| 6,505,098 B1 * | 1/2003 | Sakamoto et al. | 700/245 |
| 6,516,246 B1 * | 2/2003 | Derakhshan | 700/245 |
| 6,711,467 B1 * | 3/2004 | Inoue et al. | 700/245 |
| 6,711,469 B1 * | 3/2004 | Sakamoto et al. | 700/245 |
| 6,714,840 B1 * | 3/2004 | Sakaue et al. | 700/245 |
| 6,718,231 B1 * | 4/2004 | Konno et al. | 700/245 |
| 6,718,232 B1 * | 4/2004 | Fujita et al. | 700/245 |
| 6,754,560 B1 * | 6/2004 | Fujita et al. | 700/245 |
| 6,760,645 B1 * | 7/2004 | Kaplan et al. | 700/245 |
| 6,782,341 B1 | 8/2004 | Schurmann | |
| 6,850,818 B1 * | 2/2005 | Sabe et al. | 700/257 |

FOREIGN PATENT DOCUMENTS

WO   WO 02/23474   3/2002

OTHER PUBLICATIONS

U.S. Appl. No. 10/089,369, filed Aug. 24, 2004, Schurmann.
Meystel & Albus: Intelligent Systems: Architecture Design and Control; John Wiley & Sons, New York (2002); Whole Book.
Schurmann: An Example of a Motivated Agent; (1998); Whole Docum.

* cited by examiner

Primary Examiner—Thomas G. Black
Assistant Examiner—McDieunel Marc

(57) ABSTRACT

A method and a sub-system, henceforth called method DKA, for the determination and control of the activities of an emotional system aS, belonging to the class of autonomous, motivated agents and robots, is described. The method DKA determines the current motivation of the system aS to carry out an activity. Said motivation is determined by stimulus patterns in situation models and the intensities of the satisfactions and the desires with regard to the needs of the system aS. Priorities for the activities of the aS are determined by motivations. DKA controls sub-activities which, at the request of the system aS, are carried out by other agents/robots. The method DKA can assess which objects, situations and activities are presently good and which are bad for the system aS. The applied internal representation of the world of the system aS can include very abstract situation models. Emotional systems, controlled by the method DKA, are particularly suitable: for the care of the sick, as robotic servants for carrying out domestic tasks and for routine client services.

7 Claims, No Drawings

DETERMINATION AND CONTROL OF ACTIVITIES OF AN EMOTIONAL SYSTEM

FIELD OF THE INVENTION

The present invention relates to methods for determining and controlling activities of a motivated autonomous robot or agent system, and a method for perceiving objects and situations by a robot; the invention may be embodied in a robot/agent as a software and makes this robot/agent motivated, autonomous and emotional.

DESCRIPTION OF THE RELATED ART

Motivated robots and agent systems are known, s, e.g. Meystel & Albus [MeA] (2002), d'Inverno & Luck [InL] (2001) and Müller [JMü] (1996). The existing robots/agents have very restricted autonomy, do not have internal representation of its world, and their motivation to execute activities (if they have such motivation) do not meet the requirements of an intelligent autonomous robot.

I developed an other kind of agents/robots in [AS1] (1998), [AS2] (1998) and [AS3] (1998); they functions on basis of situation models, activity schemas (in short activities) and motivation functions. Because these motivation functions have very restricted application and they function not intelligent in some cases, I concluded that an autonomous intelligent robot/agent must be an emotional one. This conclusion was not original because, in 1986, M. Minsky concluded that "the question is not whether intelligent machines can have any emotions, but whether machines can be intelligent without any emotions" (in The Society of the Mind; Simon and Schuster; New Yourk, 1986). Therefore I developed (the inventions [AS5] (2002) and [AS6] (2002) a representation of emotions and rules according to which emotions develop, such that they can be conveniently established in a robot like machine. The inventions [AS5] and [AS6] are basis for the emotional system described below.

BRIEF SUMMARY OF THE INVENTION

The aim of the invention is to specify the following two methods embodied in an emotional system, denoted by aS: (i) a method, denoted by DKA, for steering and controlling the behavior of the system aS by means of a current motivation of the system aS to execute an activity or command, where this motivation depends on current intensities of satisfactions and desires of this system, (ii) a method for perceiving objects and situations from the actual surrounding of the system aS. These two methods, especially the method DKA, specify the frame of the system aS and make this system motivated, autonomous and emotional.

Said system aS is the preferred embodiment of the invention and contains additionally the following components:

WP—the subsystem specified by said method for perception of objects and situations;
Bd(aS)—a set of needs of aS, e.g. AN—the need for recognition and acknowledgment;
EBV—a system of rules and procedures, such as given in Schurmann [AS5] and [AS6], which determine intensities of satisfactions and desires with respect to the needs of aS;
SeG—a graph of object and situation models representing the world of aS;
AM—a set of activities (e.g. activity schema, operations) which aS can execute;
KP—a set of cognitive procedures (some of these procedures belong to WP and to EBV);
Ex-contr-motion—a subsystem which executes motion activities of aS.

A DKA-like method for steering the behavior of an agent or a robot has not been developed till now. The method DKA determines the behavior of aS by the current motivations which are determined by intensities of satisfactions and desires, and by stimulus patterns in situation models, with respect to needs in Bd(aS)—motivations of aS are determined in quite different way than in known agents and robots (s. e.g. Meystel & Albus [MeA] (2002), d'Inverno & Luck [InL] (2001) and Müller [JMü] (1996)). The main advantages of the method DKA, compared with other controlling methods are: (i) it makes the system aS autonomous, (ii) it handles urgent situations with appropriate high priority, (iii) it can judge which objects, situations and activities are good (at present time) and which are bad for the system aS. The method DKA determines the behavior of aS on the basis of: the current satisfactions and desires of aS, the internal representation of the world of aS and the current perceived objects and situations.

The perception method which specify the subsystem WP uses said internal representation of the world of aS (said graph SeG), which contains station models of high abstraction levels (of low resolution levels, according to Meystel & Albus [MeA]), which do not occur in other agents and robots (s, e.g. [MeA], d'Inverno & Luck [InL] and Müller [JMü]). The perception by this method focuses the attention on objects and situations for which, at present, the system aS has high intensities of desires for attention and curiosity.

Learning methods are not considered in this paper. However, the method DKA can judge how good or bad are objects and situations, on the basis of changes of satisfactions and desires of aS, when these objects and situations are perceived. This possibility and the internal representation of the world of aS enable to build in learning methods into DKA that can be more effective than the learning methods given in Meystel & Albus [MeA]. Also cooperation of aS with other agents and robots are considered only incidentally—with which robot aS cooperates must follow from the model of this robot and activity schemas which aS has. On the basis of the internal world representation SeG of aS and the used representation of emotions, the meaning of a natural language, which the system aS could use, can be determined.

A simplified system aS, with reacting motivation only, can be specified and used as a robot/agent which would work autonomously and efficiently in a not very complex surrounding.

Emotional systems aS can be applied everywhere where autonomous intelligent robots/agents are needed, e.g. as: (i) robots taking care of ill and old people, (ii) artificial servants making housemaid works or routine services for clients, (iii) robots making autonomous activities in a manufacturer, in a desert or on the moon.

The structure of this description: in Section 2 are given the notions needed for the description of the method DKA: intensities of satisfactions and desires, stimulus patterns and stimulus intensity, models of objects, situations and activities; the internal representation of the surrounding (the component SeG) is defined. In Section 3 are described motivations of aS to execute activities, commands and sub-activities. The method for perception of objects and situations is given in Section 4. On the basis of Sections 2, 3 and 4, is described the method DKA (Section 5).

DETAILED DESCRIPTION OF THE INVENTION

In this section I define notions needed for description of the method DKA.

2.1. Satisfaction, Desire, Stimulus Patterns and Stimuli

Below in this paper, we use the following notions und functions described in my paper [AS5] (2002). Emotional system aS has a set Bd(aS) of needs. To Bd(aS) belong e.g. GR (to belong to a community), AN (for recognition, acknowledgment and self-esteem). The state of desire and satisfaction (or dissatisfaction) of aS, with regard to need b, at time t, is described by functions:

$0 \leq des(aS,b,t) \leq 60$, $-30 \leq bef(aS,b,t) \leq 30$, for $b \in Bd(aS)$ where des(aS,b,t) is the intensity of desire and bef(aS,b,t) the intensity of satisfaction of the need b at time t. These functions have the following properties:

i. Increasing function bef(aS,b,t) means aS satisfies need b (positive stimulus) and is perceived by aS with approval, joy or happiness.

ii. When bef(aS,b,t)<0 and does not increase then aS perceives bef(aS,b,t) as a negative stimulus (disappointment, annoyance, sadness, suffering) with respect to need b. Decreasing values bef(aS,b,t)<0 mean stronger negative stimulus with regard to need b.

iii. des(aS,b,t) is the intensity of desire of aS to satisfy need b at time t. The greater des(aS,b,t) the greater is the desire of aS to satisfy need b. des(aS,b,t)<0.5 means 'need b of aS is well satisfied at time t'.

iv. The greater des(aS,b,t) the greater is the approval and joy of aS when bef(aS,b,t) increases, and the greater is the dissatisfaction, annoyance and grief of aS when bef(aS,b,t)<0 and decreases.

aS has models of objects and situations (OSM) of its world (described in Sect 2.2), and models of activities which vP can execute (described in Sect. 2.3).

Stimulus patterns. Expected changes of values bef(aS,b,t) and des(aS,b,t), caused by object or situation OSM, are represented in OSM by stimulus patterns of the following form:

$$([°|Nba,] \, fs(aS,b)=([°|p;] \, n; \, (y1,z1), \ldots, (yn,zn); \, q \, ht) \, [°|z \, eu][°|; \, OSM1.Ej][°|; \, if \, C]) \quad (2.1)$$

where [tex1| ... |texk] denotes one of the words tex1, ... , texk, ° is the empty word, Nba and n are natural numbers, ($1 \leq n \leq 10$), fs denotes name of a stimulus pattern, $0 \leq p \leq 1$, $-30 \leq yi \leq 30$, $-55 \leq zi \leq 60$, yi and zi are simple arithmetical expressions, q ht denotes a time period (e g: 0.5 h, 3 days, 1 week), $n*q \, ht \leq 720 \, h$, $z>0$, eu denotes a measure (e g kg, g, h, km, m, f) and e.g. /200 g denotes 'pro 200 g'. Nba is increased by 1 when pattern (2.1) is applied. Nba/N is the probability that the pattern fs(aS,b)=( . . . ) is valid, where N is attached to the model OSM and increases by 1 when the model OSM is applied. C is a condition. If C occurs then [°|Nba,] fs(aS,b)=( . . . ) can be applied only if C is true. If OSM1.Ef occurs then the pattern fs(aS,b)=( . . . ) concerns the pattern Ej=('ds',( . . . fse(aS,b)=( . . .) . . . )) in OSM1. Example of a pattern (occurring in OSM):

$$epb(aS,b)=(n; \, (y1,z1), \ldots, (yn,zn); \, q \, ht) \, [°|z \, eu] \quad (2.2)$$

where (fs=epb) yn>1+y1 and z1>1+zn. The meaning: aS can execute (at time t) an activity, AV, such that when aS uses OSM in AV then aS expects that OSM will increase bef(vP, b,.) and decrease des(vP,b,.) according to the pattern (2.2). Exact description of all patterns and their meanings is given in Schurmann [AS5], Sect. 2.2.

In Schurmann [AS6] are given rules which determine the changes of values bef(aS,b,t) and des(aS,b,t), caused by objects and situations (OS), for some needs b. To perceive the stimuli of these objects and situations, appropriate stimulus patterns must be built in object and situation models, OSM, representing OS (OS is recognized as OSM). The new stimulus patterns occur in model OSM, as properties, in the following form $$('dr',Nb,stp(b)=( \ldots ), \, [if \, C]) \quad (2.3)$$

where Nb increases by 1 when this pattern is applied, C is a condition (the pattern can be applied only when this condition holds) and patterns stp(b)=( . . . ) are defined below. This property means: when aS recognizes an object or a situation as OSM then aS expects that OSM, with probability Nb/N, will change or support the changes of bef(aS,b,t) and des(aS,b,t) approximately as given by the pattern stp(b)=( . . . ), where N has the same meaning as above. In opposition to the stimulus patterns (2.1), patterns (2.3) are not used to compute the values bef(aS,b,t) and des(aS,b,t). Patterns (2.3) are used only to compute the stimulus of OSM. The patterns stp(b)=( . . . ) have the following simple forms:

i. eps(b)=(y,z)

where $-29 \leq y \leq 30$, $0 \leq z \leq 60$. When aS perceives OSM (and condition C holds) then aS expects that OSM, with probability Nb/N, will increase the value bef(aS,b,t) approximately to y and decrease the value des(aS,b, t) approximately to z.

ii. ens(b)=(yz)

where $-30 \leq y \leq 29$, $0 \leq z \leq 60$. aS expects that OSM, with probability Nb/N, will decrease bef(aS,b,t) approximately to y and increase the value des(aS,b,t) approximately to z.

iii. ups(b)=(p,OSM1.Ej)

where $0<p \leq 1$ and in the model OSM1 is property Ej=('dr', .,eps(b)=(yz), . . . ). aS expects that OSM, with probability Nb/N, will support in degree p the positive changes of values bef(aS,b,t) and des(aS,b,t) according to the pattern in Ej.

iv. uns(b)=(p,OSM1.Ej)

where $0<p \leq 1$ and in the model OSM1 is property Ej=('dr', .,ens(b)=(yz), . . . ). aS expects that OSM, with probability Nb/N, will support in degree p the negative changes of values bef(aS,b,t) and des(aS,b,t) according to the pattern in Ej.

v. vps(b)=(p,OSM1.Ej)

where $0<p \leq 1$ and in the model OSM1 is property Ej=('dr', .,eps(b)=(y,z), . . . ). aS expects that OSM, with probability Nb/N, will prevent in degree p the positive changes of values bef(aS,b,t) and des(aS,b,t) according to the pattern in Ej.

vi. vns(b)=(p,OSM1.Ej)

where $0<p \leq 1$ and in the model OSM1 is property Ej=('dr', .,ens(b)=(yz), . . . ). aS expects that OSM, with probability Nb/N, will prevent in degree p the negative changes of values bef(aS,b,t) and des(aS,b,t) according to the pattern in Ej.

Stimulus intensity.

The expected (by aS, at time t) intensity of positive stimulus of pattern (2.1) is given by epr(aS,OSM,fsp,b,.,t) (defined in [AS5], Sect. 2.3.1), where fsp denotes the following (positive) pattern names: epb, upb, vnb, epbu, upbu. Let fsn denotes the following names of (negative) patterns: enb, unb, enbu, unbu, vpb, vnb. The expected (by aS, at time t) intensity of negative stimulus of pattern (2.1) (where fs=fsn) is given by enr(aS,OSM,fsn,b,.,t) (defined in [AS5], Sect 2.3.2).

For the positive stimulus patterns eps, ups and vns, we define epr as follows:

$$epr(aS, \, OSM, \, eps, \, b, \, . \, , \, t) = (Nb/N) * des(aS, \, b, \, t) *$$

-continued $$\sqrt{((y - bef(aS, b, t))^2 + cr2 * (des(aS, b, t) - z)) * nq(b))},$$

if $y \geq bef(aS, b, t)$ and $des(aS, b, t) \geq z$ $= 0$, otherwise where cr2=0.4 and 0.5<nq(b)≤720 may be defined as follows: nq(GR(G))=270 (GR(G)—the need to belong to the community G). nq(NEw(OSM))=40 (NEw(OSM)—the need for curiosity and knowledge when perceiving an object or a situation OSM). nq(NEk(OSM))=50 (NEk(OSM)—the need for curiosity and knowledge of properties of OSM), nq(NEz(SM))=60 (NEz(SM)—the need of knowledge of how situation SM can be reached), nq(MA))=25 (MA—the need to have power over people and animals), nq(SE)=200 (SE—the need for sexual relations), nq(Li(OSA))=550 (Li (OSA)—the need for liking and love of aS to OSA, i. e. to object, situation or activity OSA), nq(AN)=570 (AN—the need for recognition, acknowledgment and self-esteem), nq(MB)=120 (MB—material and financial needs of aS), nq(BH(OK))=400 (BH(OK)—the need to help OK when OK needs help), nq(VR(PG))=10 (VR(PG)—the need for retaliation and revenge on PG). nq(WA(Pa))=240*ag(Pa) (WA(Pa)—the need to accomplish the commands and wishes of person or agent Pa). and 0≤ag(Pa)≤3 is the weight of authority of Pa over aS.

$epr(aS,OSM,ups,b,.,t)=(Nb/N)*cb1*p*epr(aS,OSM1,eps,b,.,t)$ where cb1=0.3 and eps(b)=( . . . ) is in OSM1.Ej.

$epr(aS,OSM,vns,b,.,t)=(Nb/N)*p*enr(aS,OSM1,ens,b,..t)$, where ens(b)=( . . . ) in OSM1.Ej.

For the negative stimulus patterns ens, uns and vps, we define negative stimulus intensity enr as follows:

$$enr(aS, OSM, ens, b, . , t) = (Nb/N) * z * \sqrt{(((bef(aS, b, t) - y)^2 + cr2 * (z - des(aS, b, t))) * nq(b))},$$

if $y \leq bef(aS, b, t)$ and $des(aS, b, t) \leq z$ $= 0$, otherwise.

$enr(aS,OSM,uns,b,.,t)=(Nb/N)*cb1*p*enr(aS,OSM1,ens,b,.,t)$, where ens(b)=( . . . ) is in OSM1.Ej.

$enr(aS,OSM,vps,b,.,t)=(Nb/N)*p*epr(aS,OSM1,eps,b,.,t)$, where eps(b)=( . . . ) is in OSM1.Ej.

The intensity of positive stimulus of OSM (at time t) is given by $pros(aS,OSM,t)=\Sigma_{be\ Bp}\ epr(aS,OSM,fsp,b,.,t)$ where Bp={b∈ WB|( . . . fsp(aS,b)=. . . ) is in OSM}. fsp denotes a positive stimulus pattern (epb, upb, vnb, epbu, upbu, eps, ups, vns), WB={b∈ Bd(aS)|des(aS,b,t) >0.25*mdes(aS,t)} and mdes(aS,t)=max(des(aS,b,t), for b ∈ Bd(aS)).

The intensity of negative stimulus of OSM (at time t) is given by:

$nros(aS,OSM,t)=\Sigma_{be\ Bn}\ enr(aS,OSM,fsn,b,.,t)$ where Bn={b∈ WB|( . . . fsn(aS,b)=. . . ) is in OSM} and fsn denotes a negative stimulus pattern (enb, unb, enbu, unbu, vpb, ens, uns, vps). The intensity of stimulus of OSM at time t (s. [AS5], Sect. 2.3.3):

$rosa(aS,OSM,t)=pros(aS,OSM,t)-nros(aS,OSM,t)$

Updating the Stimulus Patterns (2.3).

The following 4 rules are an example of how, on the basis of satisfactions, aS can learn which objects and situations (and in what degree) accomplish, support or prevent the satisfactions and desires of aS. Analogous rules can also be formulated for activities. Stimulus patterns ('dr',Nb, stp (b)=( . . . ) . . . )in an object or situation model OSM can be updated as follows.

RN. When aS perceives an object or a situation as model OSM then: N:=N+1.

Rdr1. If object or situation OSM increased (decreased, respectively) bef(aS,b,.) or decreased (increased, respectively) des(aS,b,.) and in model OSM is property ('dr',Nb, eps(b)=(y,z) . . . )(('dr',Nb, ens(b)=(y,z) . . . ), respectively) then update this property as follows $Nb:=Nb+1;$ $y:=y+0.5*(bef(aS,b,t)-y);$ $z:=z+0.5*(des(aS,b,t)-z)$ where bef(aS,b,t), des(aS,b,t) are the values after the mentioned changes.

Rdr2. If (i) object or situation OSM1 increased (decreased, respectively) bef(aS,b,.) or decreased (increased, respectively) des(aS,b,.) and in model OSM1 is property Ej=('dr',..,eps(b)=(y,z) . . . ) (Ej=('dr',..,ens(b)=(y,z) . . . ), respectively), (ii) object or situation OSM supported, in degree pa, the in (i) said changes of bef(aS,b,.) and des(aS,b,.), (iii) in model OSM is property ('dr',Nb, ups (b)=(p,OSM1.Ej) . . . ) (('dr',Nb, uns(b)=(p,OSM1.Ej) . . . ), respectively), then update the property in OSM as follows $Nb:=Nb+1;$ $p:=p+0.5*(pa-p).$ Rdr3. If: (i) object or situation OSM1 does activity or is used to increase (to decrease, respectively) bef(aS,b,.) and in model OSM1 is property Ej=('dr',..,eps(b)=(yz) . . . ) (Ej= ('dr',..,ens(b)=(y,z) . . . ), respectively), (ii) object or situation OSM prevented, in degree pa, the in (i) said changes of bef(aS,b,.), (iii) in model OSM is property ('dr',Nb, vps(b)= (p,OSM1.Ej) . . . ) (('dr',Nb, vns(b)=(p,OSM1.Ej) . . . ), respectively), then update the property in OSM as follows $Nb:=Nb+1;$ $p:=p+0.5*(pa-p).$ 2.2. Object and Situation Models A simple object model of an object O is M(O)=('s-ob',VR(O); Ph1, . . . ,Phm; wF1, . . . ,wFu)

where: VR(O) is a visual representation (a visual pattern or scheme) of object O (if a visual representation of object O does not exist then VR(O)=nil);

Phe=(P(VOe), phre; where Cpe), where P(VOe) is the pointer to the part VOe of the visual representation VR(O)—this means that the phrase phre concerns the part VOe of the object O;

phre is a phrase or a phrase pattern (in abstract situation models) of a natural language, which is the designation of the object O; examples of (P(VOe), phre;, ,.): (P(visual pattern of a salmon from Alaska), 'salmon from Alaska'; . . . ), (P(visual pattern of a head of a salmon), 'head of a salmon'; . . . ), (P(visual pattern of a fir) 'fir'; . . . ), (P(visual pattern of a fir covered with snow), 'fir covered with snow'; . . . ); Cpe is a condition for words in phre; the meaning of the phrases in Phe, $e \leq m$, is the model M(O); an idea of the semantics of simple sentences, by object and situation models, is given in Schurmann [AS4];

wFi is a property of object O—it has one of the three forms: (tf, Idf, P(VOpi), Fl; if Cfi), ('inst-of', LP), ('part-of', LP) where:

$tf$ = 'ex-act', if Fi is a list of activities/operations which object O can perform, = 'use-act' if Fi is a list of elements (M(Obh), AOah), where M(Obh) is an object model and AOah denotes an activity, operation or action; meaning when object M(Obh) executes AOah then it can use object M(O), $tf$ = 'act-in', if Fi is a list of elements (M(Obh), AOah); meaning object M(Obh) may execute activity AOah in object M(O), = 'act-rem', if Fi is a list of activities which aS can execute in order to remove or to avoid unwished objects or situations from/in object M(O), = 'for', if Fi is a logical formula, = 'fea', if Fi is a property of object M(O), $tf$ = 'res', if Fi is a result (only if wFi occurs in a situation or activity model), = 'ds', if Fi is a stimulus pattern: epb, upb, vnb, epbu, upbu, enb, unb, enbu, unbu, vpb, = 'dr', if Fi is a stimulus pattern: eps, ups, vns, ens, uns, vps;

$idf$ = 'id', if Fi is an identifying property of object M(O),
$idf$ = 'nid' otherwise;

P(VOpi) is the pointer to the part VOpi of the visual representation VR(O); this means that Fi concerns the part VOpi of the object M(O) (or situation SM, in situation model SM);
Cfi is a condition—Fi can be applied only when Cfi holds;
LP is a list of pointers to object or situation models;
('inst-of', . . . P(M(Og)), . . . ) means that object model M(O) is an instance of object model M(Og) (P(OSM) denotes the pointer to object or situation model OSM); we assume that if ('inst-of', . . . ,P(M(Og)), . . . ) occurs in M(O), then M(O) has all properties that occur in M(Og); consequently, in M(O) must be given only the properties characteristic for object O: example: if O denotes Mrs. Gleen who is a nurse, married and mother of a child, then in the model M (Mrs. Gleen) should be the property ('inst-of', P(nurse), P(married woman), P(mother), . . . );
('part-of', . . . ,P(OSM), . . . ) means that object M(O) is a component of object or situation model OSM (if OSM is an object model, then it is a structured object model).

Structured object model. If M(O1), . . . ,M(On) are simple or structured object models and object Q consists of objects O1, . . . ,On then $$M(Q)=(\text{'str-ob'}, VR(Q); Ph1, \ldots ,Phm; wF1, \ldots ,wFr; (pr(O1), P(VR(O1)), M(O1)), \ldots , (pr(On), P(VR(On)), M(On)); LOS(Q)) \quad (2.4)$$

is a structured object model (of the object Q), where: VR(Q), Phe, wFi are defined above, the model M(Q) is the semantic meaning of the phrases in Phe;
pr(Oi) is the probability that object M(Oi) appears/occurs in object M(Q);
P(VR(Oi)) is the pointer to the location of object M(Oi) in VR(Q) (if the location of M(Oi) is not known or not defined then P(VR(Oi))=nil);
LOS(Q) is the list of objects and situations which can appear in object Q; LOS(Q) may e.g. have the form: ((pr(Oa1), M(Oa1)), . . . ,(pr(Oav), M(Oav)); (pr(Ss1), SMs1), . . . ,(pr(Ssq), SMsq); SFQ1, . . . ,SFQp) where: (pr(Oai), M(Oai)) ((pr(Sse), SMse), respectively) means: object M(Oai) (situation SMse, respectively) appears in object Q with probability pr(Oai) (pr(Sse), respectively);
SFQe is a situation sequence (Je, SMe1, . . . ,SMeu), where the index Je points to the situation $SM_{Je}$ which last appeared in this sequence; it holds: after situation SMej must appear situation SMe(j+1); SFQe can be a timetable showing the days or hours at which situations $SM_{Je}$ appear in Q (aS can perform some activities according to the timetable).

By stimulus patterns, aS distinguishes the wished situations (with rosa(aS,SMsi,t)>5) from the unwished ones (with rosa(aS,SMsi,t)<−4) in M(Q). It holds
rosa(aS,M(Q),t)=rosa(aS,St-p,t), where St-p={sp|sp is a stimulus pattern in wFe, e=1, . . . ,r}.

An object model is a simple or a structured object model. We assume that there is a function procedure IdO(O1,M(O)) which determines how good model M(O) represents object O1.

Situation model. If M(O1), . . . ,M(On) are object models then
SM=('s-sit', Sch; Ph1, . . . ,Phq; wF1, . . . ,wFp; (pr(O1), dm(O1), P(VR(O1)), M(O1)), . . . , (pr(On),dm(On), P(VR(On)), M(On)))
is a simple situation model, where:
Sch is a visual representation of the structure of situation SM; if SM is a visual situation then Sch can be a 3 dimensional space which aS sees from point (0,0,0); Sch can be a scheme showing how the situation model is composed of models M(O1), . . . ,M(On) and the possible motions of these objects in the situation SM;
Phi has analogous form and meaning as in the definition of object model; the meaning of a phrase or a pattern of a phrase, contained in Phi, is the model SM; example: 'Mr. and Mrs. Marlow are eating at the table in the dining room';
wFe is a property of the situation SM—it has the same form as in the definition of object model;
pr(Oi) is the probability that object M(Oi) appears in situation SM;
dm(Oi) shows motion directions of object M(Oi) in Sch;
P(VR(Oi)) and M(Oi) have analogous meaning as in the definition of structured object.
It holds: rosa(aS,SM,t)=rosa(aS,St-ps,t), where St-ps={sp|sp is a stimulus pattern in wFe, e<p}.

To represent more complex situations, I introduce meta-situations. If M(O1), . . . , M(On) are object models and SM1, . . . ,SMw are simple situation models, then mSM=('m-sit', vSch; Ph1, . . . ,Phq; wF1, . . . ,wFu; SM1, . . . ,SMw; (pr(O1), dm(O1), P(VR(O1)),M(O1)), . . . , (pr(On),dm(On), P(VR(On)), M(On)))
is a meta-situation model, where:
vSch is a scheme which shows visually the structure of the meta-situation, e.g. locations where M(Oi) and SMe occur in mSM:
Phe, wFj, (pr(Oi), dm(Oi), P(VR(Oi)), M(Oi)) have analogous meaning as in the definition of situation model.

In special cases (when mSM has been identified), mSM can contain also meta-situations—these meta-situations do not occur in object models. Remark: property of the form ('fea', 'id',., SMe), in meta-situation model mSM, means: meta-situation mSM appears only then when situation SMe is appeared. It holds
rosa(aS,mSM,t)=rosa(aS,St-pm,t), where St-pm=[sp|sp is a stimulus pattern in wFe, e≦w].

In this patent description, situation (situation model) means a simple situation (simple situation model, respectively) or a meta-situation (meta-situation model, respectively). We assume that a procedure IdS(S,SM) (IdmS (mS,mSM), respectively) determines how good simple situation model SM (meta-situation model mSM, respectively) represents simple situation S (meta-situation mS, respectively). By 'object M(O) (situation SM, respectively)' we understand an object (a situation, respectively) which is represented by model M(O) (SM, respectively).

Because of recognition of objects and situations, object and situation models must constitute a directed graph, SeG (called in this paper semantic graph: SeG is a component of aS), which shows the abstraction levels of object and situation models (graph SeG defined the author in [AS4]). SeG, thus the object and situation models, must be so defined that:
i. a node, K, is an object or situation model,
ii. node Kj is a successor of node K if and only if ('inst-of', . . . ,P(K), . . . ) occurs in the model Kj,
iii. SeG has 3 root nodes M(object), SM(simp-sit), mSM (meta-sit) such that: (a) from the node M(object) exists a path to each object node, (b) from the node SM(simp-sit) exists a path to each simple situation node, (c) from the node mSM(meta-sit) exists a path to each meta-situation node,
iv. if there is a path from node Ki to node Kj then there is no path from Kj to Ki.
By the graph SeG and the phrases in object and situation models can be described the syntax and semantics of simple natural languages, as shown in [AS4].

2.3. Activity Model

The author defined behavior scheme in [AS3] (1998)—however such schemes are not sufficient to represent activities of the system aS.

An activity model (or activity scheme, in short: activity) has the following form
activity AV(P1, . . . ,Pn), ta, tv, Pβ1, . . . ,Pβu; resp (rs1: r1), . . . ,(rsk: rk); Mst-p;
inits (ifb SMa1: (pz1(SMz1), SMz1), . . . .(pz1(SMzh), SMzh); (pu1(SMu1), SMu1), . . . ,(pu1(SMur),SMur)), . . . ,(ifb SMaq: (pzq(SMz1), SMz1), . . . ,(pzq(SMzh), SMzh); (puq(SMu1), SMu1), . . . ,(puq(SMur),SMur));
goals SMz1, . . . ,SMzh; begin (V, SB) endact
where: P1, . . . ,Pn denote parameters used when activity AV is executed;
ta—period of time needed for execution of activity AV.
tv—period of time which aS personally needs (i.e. its processor PrA) for execution of the activity; ta, tv and (rsj: rj) can depend on parameters P1, . . . ,Pn;
Pβe=(phrβe; where CSe), where phrβe is a phrase (e.g. a simple sentence) of a natural language, which designates the activity AV—the activity AV is the meaning of the phrase phrβ3;
rsj: rj—resources (means, objects) which aS needs for execution of the activity AV—rsj denotes the needed object and rj the needed quantity of rsj;
Mst-p—set of stimulus patterns describing the expected stimuli which arise when the activity AV is being executed;
SMai—initial situations of the activity AV—in these situations aS may begin the execution;

Because of recognition of objects and situations, object and situation models must constitute a directed graph, SeG (called in this paper semantic graph; SeG is a component of aS), which shows the abstraction levels of object and situation models (graph SeG defined the author in [AS4]). SeG, thus the object and situation models, must be so defined that:
i. a node, K, is an object or situation model.
ii. node Kj is a successor of node K if and only if ('inst-of', . . . ,P(K), . . . ) occurs in the model Kj,
iii. SeG has 3 root nodes M(object), SM(simp-sit), mSM (meta-sit) such that: (a) from the node M(object) exists a path to each object node, (b) from the node SM(simp-sit) exists a path to each simple situation node, (c) from the node mSM(meta-sit) exists a path to each meta-situation node,
iv. if there is a path from node Ki to node Kj then there is no path from Kj to Ki.
By the graph SeG and the phrases in object and situation models can be described the syntax and semantics of simple natural languages, as shown in [AS4].

2.3. Activity Model

The author defined behavior scheme in [AS3] (1998)—however such schemes are not sufficient to represent activities of the system aS.

An activity model (or activity scheme, in short: activity) has the following form
activity AV(P1, . . . ,Pn), ta, tv, Pβ1, . . . ,Pβu; reso (rs1: r1), . . . ,(rsk: rk); Mst-p;
inits (ifb SMa1: (pz1(SMz1), SMz1), . . . ,(pz1(SMzh), SMzh); (pu1(SMu1), SMu1), . . . ,(pu1(SMur),SMur)), . . . ,(ifb SMaq: (pzq(SMz1), SMz1), . . . ,(pzq(SMzh), SMzh); (puq(SMu1), SMu1), . . . ,(puq(SMur),SMur));
goals SMz1, ...,SMzh; begin (V, SB) endact
where: P1, . . . ,Pn denote parameters used when activity AV is executed;
ta—period of time needed for execution of activity AV,
tv—period of time which aS personally needs (i.e. its processor PrA) for execution of the activity; ta, tv and (rsj: rj) can depend on parameters P1, . . . ,Pn;
Pβe=(phrβe; where Cβe), where phrβe is a phrase (e.g. a simple sentence) of a natural language, which designates the activity AV—the activity AV is the meaning of the phrase phrβe;
rsj: rj—resources (means, objects) which aS needs for execution of the activity AV—rsj denotes the needed object and rj the needed quantity of rsj;
Mst-p—set of stimulus patterns describing the expected stimuli which arise when the activity AV is being executed;
SMai—initial situations of the activity AV—in these situations aS may begin the execution:
SMze—goal situations of the activity AV—activity AV is executed in order to reach a goal situation; SMzi is a final node of the graph (V, SB);
SMui—a final node of the graph (V, SB) but not goal situation—not wished situation which can be reached when the activity is executed;
pzi(SMze) (pui(SMue), respectively)—the probability that the goal situation SMze (situation SMue, respectively)

will be reached when the execution of the activity begins at the initial situation SMai;

(V, SB)—a connected graph the nodes (in V) of which are situation models, and to each are (SMi, SMj) is ascribed a sub-activity, su-act(SMi,SMj)∈ SB.

Sub-activity su-act(SM,SMj) (in activity AV) determines the elementary activities, operations and actions which should be executed to reach the situation SMj, when the execution of the activity AV reached the situation SM. Sub-activity su-act(SM,SMj) has one of the two forms:

(sa1) (aS, LPj; (ta1j, ta2j), reso (roj1: nj1), . . . ,(roja: nja); wj, (wsj, SMj), (wsj1, SMj1), . . . ,(wsjv, SMjv); (OAj1; . . . ;OAjm)), when aS himself (i.e. its processor PrA) does this sub-activity, (sa2) (Mcaj, LPj; (ta1j, ta2j), reso (roj1: nj1), . . . ,(roja: nja); contr-su-actj, wj, (wsj, SMj), (wsj1, SMj1), . . . , (wsjv, SMjv); (Aj1; . . . ;Ajm)), when Mcaj does this sub-activity and aS controls only the execution, where: $LPj=(pszj(SMz1), \ldots ,pszj(SMzh); psuj(SMu1), \ldots ,psuj(SMu1), \ldots ,psuj(SMur)$ is the list which determines the priority of this sub-activity, where pszj(SMzi), (or psuj(SMue)) is the probability of reaching the goal situation SMzi (the situation SMue, respectively) when su-act(SM, SMj) will be executed; it holds $pszj(sMz1)+ \ldots +pszj(SMzh)+psuj(SMu1)+ \ldots +psuj(SMur)=1$;

ta1j, ta2j is the minimal and maximal time period needed for execution of this sub-activity;

roji, nji—resources needed for execution of the sub-activity; nji denotes the needed quantity of object roji;

wj, wsj, wsji are weights—wj increases if this sub-activity is executed, wsj (wsji, respectively) increases if the execution of this sub-activity led to situation SMj (SMji, respectively);

SMj, SMj1, . . . ,SMjv are successors of the node SM in the graph (V, SB): they are the expected situations which can be reached when this sub-activity is executed;

OAje is an elementary activity which has one of the following forms:

a) OAje is an elementary activity or action which does not begin with if or while; OAje can depend on parameters; OAje is mainly a motion activity which aS should perform;

b) if Ce then begin OAk1; . . . ;OAkd end else begin OAf1; . . . ;OAfw end c) while Ce do begin OAk1; . . . ;OAkw end where Ce, in (b) and (c), is a condition, and OAki, OAfs are activities of the form (a);

Mcaj denotes a processor, robot, agent, machine or an other system which does the sub-activity (sa2); aS controls this execution by the control-activity contr-su-actj;

contr-su-actj denotes the following simple control-activity contr ctj, atj, grj do OApj1; . . . ;OApjb thenc observ(tatj, FOSj,t); CAj1; . . . ;CAjd endc where: aS should control the execution of sub-activity (sa2) after each time period ctj, atj is the time period of execution of the sub-activity by Mcaj after the last control, $0<grj \leq 2$ is a degree of importance of controlling the execution of the sub-activity, OApje are elementary activities which aS does to control the execution of the sub-activity, observ(tatj,FOSj,t) observes, at least tatj time period, objects and situations given in $FOSj=M(Oxj1), \ldots ,M(Oxjg); SM1xj1, \ldots ,SM1xjs$, where M(Oxji) and SM1xje are (expected) objects and situations which can appear when the sub-activity is being executed; these objects and situations observ(tatj,FOSj,t) observes with intensities des(aS,AUw(M(Oxji)),t), $i \leq g$, and des(aS,AUw(SM1xje),t), $e \leq s$;

CAje, $e \leq d$, are control activities of the form ifs sitExpje then begin OAxje1; . . . ;OAxjef end sitExpje is a situation expression of the form:

i) situations SMxje, $e \leq d1$, are situation expressions, where SMxje are expected between-situations which can appear when the sub-activity (sa2) is being executed;

ii) when SMEx1 and SMEx2 are situation expressions then (SMEx1), not (SMEx1), SMEx1 or SMEx2, SMEx1 and SMEx2 are situation expressions—they have the following meaning: SMxje, (SMxje)—situation SMxje is appeared, situation not (SMEx1) is appeared when situation SMEx1 is not appeared, situation SMEx1 or SMEx2 is appeared when situation SMEx1 or SMEx2 is appeared, situation SMEx1 and SMEx2 is appeared when situations SMEx1 and SMEx2 are appeared;

OAxje, $e=1, \ldots ,f$, are elementary activities which aS executes when situation sitExpje has appeared.

The Execution of Sub-activity.

aS does himself the sub-activity (sa1) (i.e. the (motion) activities OAj1; . . . OAjm) to reach the situation SMj (with probability (approximately) wsj/wj) from the situation SM. However, instead of SMj, aS can reach situation SMje ($e \leq v$), with probability (approximately) wsje/wj. When a situation SMj, SMje, $e \leq v$, appears, then the execution of the sub-activity (sa1) (or (sa2)) is finished. The execution of sub-activity (sa1) or (sa2) is wrong and should be abandoned if the sub-activity is executed longer than ta2j.

Sub-activity (sa2) does Mcaj to reach situation SMj, with probability (approximately) wsj/wj; however, Mcaj (and aS) can reach (with probability (approximately) wsje/wj) situation SMje, $e \leq v$. Activities Aj1, . . . ,Ajm are done by Mcaj, When Mcaj is doing sub-activity (sa2), then some situations SMxji, $i \leq d1$, should appear until one of the situations SMj, SMje, $e \leq v$, appears. After every time period ctj, or earlier, aS should control the execution of the sub-activity by contr-su-actj; firstly, it executes the elementary motion activities OApj1; . . . ;OApjb, after that, the observing activity observ(tatj,M(Oxj1), . . . ,M(Oxjg); SM1xj1, . . . ,SM1xjs;t) at least tatj long; after the time period tatj, aS does the first activity CAje for which holds: 'situation sitExpje is appeared'—i.e. when sitExpje is appeared then aS does the elementary activities OAxje1; . . . ;OAxjef (which are in CAje). In this way, aS may correct or abandon the execution of the sub-activity if sitExpje represents an unwished situation. When Mcaj begins the execution of the sub-activity then: atj:=0. After aS controlled this execution then: atj:=0. aS is motivated to do the control-activity contr-su-actj in (sa2). The intensity of this motivation equals mot-cont(AV,SM,SMji,atj,t)=(atj/ctj)*grj*motsu-act(SM, SMj,t)

where atj is the duration of execution of the sub-activity (sa2) (without interruptions) after the last control by contr-su-actj, and motsu-act(SM,SMj,t) is the motivation of aS to execute the sub-activity (sa2) (this motivation is defined in Sect. 3.2).

3. The Motivation to Execute an Activity or a Command

According to the method DKA, the execution of an activity or a command is determined by the motivation of aS. This motivation is determined by several kinds of motivations as follows.

3.1. The Motivation to Execute an Activity

We use the notation applied in the definition of activity. The reacting motivation of aS (at time t) to execute an activity AV, starting at initial situation SMai, equals reamota(aS,SMai,AV,t)=rosa(aS,Mst-p,t)+pzi(SMz1)
*rosa(aS,SMz1,t)+ . . . +pzi(SMzh)*rosa(aS,SMzh,t)+
pul(SMu1)*rosa(aS,SMu1,t)+ . . . +pui(SMur)*rosa
(aS,SMur,t)

in normal circumstances should be rosa(aS,SMze,t)>0, for $e \leq h$, and rosa(aS,SMue,t)<0, for $e \leq r$.

Reflective motivation. aS may have calculated the expected satisfactions, bef(aS,b,t+e*g), and desires, des(aS,b,t+e*g), for e=1, . . . ,$e_b$, (e.g. by stimulus patterns, as shown in [AS5]), for some needs b, where g denotes a number of hours, days or weeks. If e.g. bef(aS,b,t1)<-5 and des(aS,b,t1)>12, for t+e1*g<t1<t+e2*g, and aS has an activity AV1 which will increase bef(aS,b,t1) and decrease des (aS,b,t1) when aS executes AV1 in the time (t, t1), then aS is motivated to execute this activity. In this case, the motivation is arisen by reflection on the future intensities of satisfactions and desires.

The motivation of aS (at time t) to execute activity AV, from initial situation SMai, in order to increase satisfactions in the future, at time t1, equals refimota(aS,SMai,AV,t,t1)=rosa(aS,Mst-p,t)+pzi(SMz1)
*rosa(aS,SMz1,t1)+ . . . +pzi(SMzh)*rosa(aS,SMzh,
t1)+pui(SMu1)*rosa(aS,SMu1,t1)+ . . . +pui(SMur)
*rosa(aS,SMur,t1)

where t1>t+ta (ta is the time period needed for execution of AV).

Compelled motivation. aS may be in an initial situation SMai of an activity AV such that if aS does not execute the activity AV then aS will get, after a time period zt, with probability pg, into an unwished situation SMd such that rosa(aS,SMd,t1)<-4, for t1$\geq$t. If however aS executes activity AV and reaches a goal situation of this activity, then aS will not get into the situation SMd. These relation we denote by compst(aS,SMai,AV,zt,pg,SMd)     (3.1)

Thus, if the relation (3.1) holds, then aS is motivated to do the activity AV in order not to get into the unwished Situation SMd. The relation (3.1) is connected with SMai and AV by the following set AK(SMai):

i. if SMai is an initial situation of an activity AV then AV belongs to AK(SMai),
ii. if activity AV belongs to AK(SMai) and (3.1) holds for SMai and AV, then compst(aS,SMai,AV,zt,pg,SMd) belongs to AK(SMai).

Compelled reacting motivation. If compst(aS,SMai,AV,zt,pg,SMd) is in AK(SMai), where zt$\leq$1 min, then the compelled reacting motivation (at time t) to do the activity AV equals:

copreamota(aS,SMai,AV,pg,SMd,t)=reamota(aS,SMai,
AV,t)-pg*rosa(aS,SMd,t).

Compelled reflective motivation. If reflmota(aS,SMai,AV,t,t1) is defined, where t1>t+ta>t+1 min, and compst(aS,SMai,AV,t1-t,pg,SMd) is in AK(SMai), then the compelled reflective motivation (at time t) to do the activity AV equals:

coprefmota(aS,SMai,AV,pg,SMd,t,t1)=reflmota(aS,
SMai,AV,t,t1)-pg*rosa(aS,SMd,t1).

The motivation to execute activity. The above described motivations are used to determine the motivation of aS (at time t) to execute activity AV, from initial situation SMa, in the following way. To simplify the description of the procedure below, we assume that for SMa and activity AV is only one relation (3.1) in AK(SMa).

procedure mot(aS,SMa,AV,t, res motak,pg,SMg,t2,art,zv1);
begin zv1:=0.2 min; pg:=0; SMg:=nil; t2:=t+0.9 min;
if compst(aS,SMa,AV,zt,pd,SMd) is in AK(SMa) and zt<1 min then begin art:='coprea'; pg:=pd; motak:= copreamota(aS,SMa,AV,pd,SMd,t); SMg:=SMd; t2:=t+zt end else begin motak:=reamota(aS,SMa,AV,t); art:='rea' end:
let t1>t+ta>t+1 min, where ta denotes the time period needed for execution of the activity AV;
Bz(AV):=[b| need b occurs in a stimulus pattern occurring in a goal situation SMze ($e \leq h$) or in an unwished situation SMui ($i \leq r$) of the activity AV];
if cognitive procedures of aS can determine intensities of satisfactions bef(aS,b,t1) and desires des(aS,b,t1), for b$\in$Bz(AV) then begin
if compst(aS,SMa,AV,t1-t,pd,SMd) is in AK(SMa) and rosa (aS,SMd,t) can be computed then
begin if coprefmota(aS,SMa,AV,pd,SMd,t,t1)>motak then
begin art:='copref'; zv1:=t1-t-ta; motak:=coprefmota (aS,SMa,AV,pd,SMd,t,t1); pg:=pd; SMg:=SMd; t2:=t1 end end else
begin if reflmota(aS,SMa,AV,t,t1)>motak then begin art:= 'refl'; zv1:=t1-t-ta; t2:=t1; motak:=reflmota(aS,SMa,AV, t,t1) end end end end mot.

The result motak of the procedure is the motivation of aS to execute activity AV, from initial situation SMa. The priority of execution of activity AV (at time t), from initial situation SMa, can be determined as follows (if the time is given in hours)

prior-a(SMa,AV,t)=motak*4.5/sqrt(zv+16), if zv>-0.02 h
(=1.2 min)

where motak and zv are determined by mot(aS,SMa,AV,t, motak,pg,SMg,t2,art,zv) (zv is the reserve time which aS has, for execution of the activity AV).

3.2. The Motivation to Execute Sub-activity

We use the notation introduced in the definition of sub-activity su-act(SM,SMj) in Sect. 2.3. Let the execution of the activity AV began, at time to, in initial situation SMai and reached, at time t, the situation SM. The operation mot(aS, SMai,AV,to,motak,pg,SMg,t2,art,zv) has been executed. The motivation, at time t>to, to execute sub-activity su-act (SM,SMj) equals $$\begin{aligned}
motsu\text{-}act(AV, SM, SMj, t) &= morea, \text{ if } art = \text{'rea'} \\
&= morea\text{-}pg * rosa(aS, SMg, t), \\
&\quad \text{ if } art = \text{'coprea'} \\
&= morefl, \text{ if } art = \text{'refl'} \\
&= morefl\text{-}pg * rosa(aS, SMg, t2), \\
&\quad \text{ if } art = \text{'copref'}
\end{aligned}$$

where pg, SMg, art and t2 are determined by the above mentioned operation mot and morea=pszj(SMz1)*rosa(aS,SMz1,t)+ . . . +pszj(SMzh)
*rosa(aS,SMzh,t)+psuj(SMu1)*rosa(aS,SMu1,t)+ . . .
+psuj(SMur)*rosa(aS,SMur,t), merefl=psuj(SMz1)*rosa(aS,SMz1,t2)+ . . . +pszj(SMzh)
*rosa(aS,SMzh,t2)+psuj(SMu1)*rosa(aS,SMu1,t2)+ . .
. +psuj(SMur)*rosa(aS,SMur,t2).

When activity AV is performing a command received from Pa, then additionally the operation is executed:

motsu-act(AV,SM,SMj,t):=motsu-act(AV,SM,SMj,t)+epr
(aS,M(Pa),eps,WA(Pa),.,t)+epr(aS,M(Pa),eps,AN,.,t).

3.3. The Motivation to Perform Command aS can receive a command/order, BOf, to execute, interrupt or abandon an activity, from an authorized person or an other emotional system, Pa. For each Pa, authorized to give orders, aS has weight, ag(Pa), of the authority of Pa over aS. We assume that $0 \leq ag(Pa) \leq 3$; the greater ag(Pa) the greater is the authority of Pa over aS. When P1a has given aS a command/order BOf, then are applied the following rules.

RPa1. If ag(Pa)>ag(P1a), then Pa can abandon the execution of the command BOf or command aS to continue the execution of the abandoned execution of the order BOf.

RPa2. If ag(Pa)≦ag(P1a), then Pa is not authorized: (a) to abandon the execution of the command BOf, (b) to command aS to continue the execution of the abandoned execution of BOf.

An order BOf must contain the following information: wg(BOf)—how important is the order BOf, zt(BOf)—the time period in which the execution of the order BOf should start. We may interpret wg(BOf) as follows: wg(BOf)=0.5 if BOf is of little importance to Pa, wg(BOf)=1.3 if BOf is of not much importance to Pa, wg(BOf)=2.2 if BOf is important to Pa, wg(BOf)=3.0 if BOf is of great importance to Pa, wg(BOf)=3.8 if BOf is of extreme importance to Pa.

For authorized Pa, aS must have the following needs: WA(Pa)—the need to fulfil the orders and wishes of Pa, AN—the need for recognition, acknowledgment and self-esteem. To make sure that aS has always the desire to satisfy the mentioned needs, the following rules are applied:

RWAN1. Every na hours aS does the following operations (for each authorized Pa):

if bef(aS,AN,t)≧−9 then bef(aS,AN,t):=max(bef(aS,AN,t)−0.6*ag(Pa), −3.3*ag(Pa));

des(aS,AN,t):=min(des(aS,AN,t)+1.2*ag(Pa), 18*ag(Pa));

if bef(as,WA(Pa),t)≧−10 then bef(aS,WA(Pa),t):=max(bef(aS,WA(Pa),t)−0.6*ag(Pa), −3.5*ag(Pa));

des(aS,WA(Pa),t):=min(des(aS,WA(Pa),t)+1.2*ag(Pa), 18*ag(Pa)).

RWAN2. When aS receives a command, BOf, from authorized Pa (at time t) then:

des(aS,WA(Pa),t):=min(des(aS,WA(Pa),t)+1.1*(wg(BOf)+2.5*ag(Pa)), 18*ag(Pa));

des(aS,AN,t):=min(des(aS,AN,t)+1.1*(wg(BOf)+2.5*ag(Pa)), 18*ag(Pa)).

RWAN3. When aS accomplished (at time t) a command, BOf, received from Pa, then:

bef(aS,WA(Pa),t):=min(bef(aS,WA(Pa),t)+wg(BOf)+2.5*ag(Pa), 8.5*ag(Pa));

des(aS,WA(Pa),t):=max(des(aS,WA(Pa),t)−1.9*(wg(BOf)+2.5*ag(Pa)), 1.6*ag(Pa));

bef(aS,AN,t):=min(bef(aS,AN,t)+(wg(BOf)+2.5*ag(Pa)), 8.5*ag(Pa));

des(aS,AN,t):=max(des(aS,AN,t)−1.9*(wg(BOf)+2.5*ag(Pa)), 1.6*ag(Pa)).

The motivation (at time t) of aS to perform a command BOf, received (at time to) from authorized Pa, is determined as follows:

i. t2:=to+zt(BOf); apply the rule RWAN2;
ii. determine the activity, AVf, which will accomplish the order BOf, and initial situation, SMfae, of this activity;
iii. mot(aS,SMfae,AVf,t,motak,pg,SMg,t3,art,zv); the motivation to perform command BOf equals mot-ord(aS,BOf,AVf,SMfae,Pa,t)=motak+epr(aS,M(Pa),eps,WA(Pa),..,t)+epr(aS,M(Pa),eps,AN,t); the motivation to execute the activity AVf equals mot-ord(aS,BOf,AVf,SMfae,Pa,t);
iv. the priority of performing the order BOf (at time t) and the activity AV: prior-ord(BOf,AVf,SMfae,Pa,t)=mot-ord(aS,BOf,AVf,SMfae,Pa,t)*4.5/sqrt(t2−t+16), prior-a(SMfae,AVf,t)=prior-ord(BOf,AVf,SMfae,Pa,t).

4. General Specification of the Subsystem WP of aS

WP identifies objects and simple situations by object and situation models which are in the semantic graph SeG (s. Sect. 2.2). If there is a path (in this graph) from an object model M(Og) (situation model SMg) to an object model M(O) (situation model SM, respectively), then M(O) (SM, respectively) is an instance of the model M(Og) (SMg, respectively). Model M(Og) (SMg, respectively) is a class of object models (situation models, respectively) to which M(O) (SM, respectively) belongs. Below, clo(M(O)) (cls (SM), respectively) denotes an object model (situation model, respectively), in graph SeG, such that from this model clo(M(O)) (cls(SM), respectively) exists a path to the model M(O) (SM, respectively). Because WP is very closely connected with the method DKA, some important properties of WP must be given.

SPW1. WP perceives the surrounding of aS through sensors, identifies objects and simple situations (not meta-situations) as instantiated object and simple situation models, and stores them in AW(t). Also sentences of a simple language are identified syntactically and semantically by WP and stored in AW(t). AW(t) is the internal representation of the actual world of aS at time t. The main part of AW(t) is a tree TOS such that:

i. To each node of the tree is ascribed an object which aS has perceived. KTOS(Wa) is the root of the tree, where M(Wa) is the model of the greatest spatial object in the world of aS. aS ("self") is always in a structured object in TOS.

ii. KTOS(Qi) is a successor of a node KTOS(Q) if and only if Q is a structured object which has appeared, and WP has recognized that object Qi has appeared direct in object Q.

iii. Each node KTOS(Q) has the following form
(P(V),sK(Q),Q,M(Q),apOS(Q),amS(Q),nOS(Q),fOS(Q),nfOS(Q),fmS(Q),dOS(Q),LOSa(Q),LbOa(Q))

where: P(V)—the pointer to the father of the node KTOS (Q), sK(Q)—the list of pointers to the successors of the node KTOS(Q).

M(Q)—WP has identified object Q as M(Q).

apOS(Q)—the list of objects and simple situations which actually appear in object Q (not foreseen objects and situations are marked with 'nexp'), amS(Q)—the list of meta-situations which actually appear in structured object Q (not foreseen meta-situation is marked with 'nexp'), nOS(Q)—the list of objects and simple situations in object Q, which just have been recognized; elements of the lists apOS(Q) and nOS(Q) have the form:

(P(VR(O1i)),O1i,M(Oi),ti,ldO(O1i,M(Oi)),ox) or (P(VR(S1e)),S1e,SMe,ti,ldS(S1e,SMe),ox)

where object O1i (situation S1e, respectively) has been identified by ldO (ldS, respectively) as M(Oi) (SMe, respectively) (at time ti); P(VRO1i)) (P(VR(S1e))) is pointer to the location of the object O1i (the situation S1e, respectively) in VR(Q); O1i (S1e) is an instantiation of the model M(Oi) (SMe, respectively); ox='exp' if M(Oi) (SMe, respectively) is declared (expected/foreseen) in object M(Q), ox='nexp' otherwise;

fos(Q)=(Q,M(Q), ob (pr(Of1),M(Of1)) . . . (pr(Ofa),M (Ofa)); sit (pr(Sf1),SMf1), . . . ,(pr(Sfw),SMfw))—the list of missed/absent objects and simple situations in object Q; WP enters these objects and situations in the list when: (a) it has recognized object Q as M(Q) and recognizes now that object M(Ofi) or simple situation SMfe is not in object Q, although it should be with probability pr(Ofi) (pr(sfe), respectively) in Q, (b) it recognizes that object M(Ofj) or simple situation SMfg is disappeared from object Q, although it should be in Q until now, with the given probability;

nfOS(Q)—the list of objects and simple situations, just having been recognized as missed/absent in object Q, fmS(Q)—the list of missed/absent meta-situations in object Q, dOS(Q)=(Q,M(Q), ob (O1d1,M(Od1)), ... ,(O1da,M(Oda)); sit (S1d1,SMd1), ... ,(S1dw,SMdw))—the list of objects and simple situations which have disappeared from object Q; WP has recognized that object O1di, identified as M(Odi), or situation S1de, identified as SMde, was in object Q and now is not in Q;

LOSa(Q)—the list of objects and situations which are connected with execution of activities (by some objects Masi) in object Q; an element of this list has the form:

EOSa(Mas)=(Mas,P(exOSa(AVh,su-akh)),P(apOSa(AVh,su-akh)),nOSa(AVh,su-akh),dOSa(AVh,su-akh) where: object Mas performs activity AVh in object Q, (i.e. the current sub-activity su-akh of AVh is being executed or is waiting for execution); the method DKA enters element EOSa(Mas) in the list, when it determines that Mas has to do the sub-activity su-akh;

P(L(Avh,.))—pointer to the list L(Avh,.) in ZuA(AVh) (ZuA (AVh) is the state of execution of the activity AVh—described in Sect. 5.1), exOSa(AVh,su-akh)—the list (in ZuA(AVh)) of objects and simple situations which can appear when sub-activity su-akh is being executed (by Mas), apOSa(AVh,su-akh)—the list (in ZuA(AVh)) of objects and simple situations which actually appear and are listed in exOSa(AVh,su-akh), nOSa(AVh,su-akh)—the list of objects and simple situations which just have appeared and are listed in exOSa(AVh, su-akh), dOSa(AVh,su-akh)—the list of disappeared objects and simple situations which were listed in apOSa(Avh,su-akh);

LbOa(Q)—the list of objects, Qi, in which Q was, and activities which Q executed; an element of this list has the following form EbOa(Qi)=((t1i,t2i),Qi,M(Qi),Lexac(Qi),ZOSa(Qi)), where:

(t1l, t2l)—the time in which object Q was or is in object Qi,

Lexac(Qi)—the list of sub-activities which Q executed in object Qi; an element of this list equals:

Eexac(AVe,s-actej)=(AVe, s-actej, t3e,t4e, P(exOSa(AVe, s-actej)), P(apOSa(AVe,s-actej)))

when Q executed sub-activity s-actej of the activity AVe, in object Qi from t3e till t4e; the method DKA puts these elements in the list Lexac(Qi):

ZOSa(Qi):=EOSa(Q) when Q just left object Qi (at time t2i), ZOSa(Qi)=nil if it is in Qi Besides the tree TOS, AW(t) contains also other data structures, e. g.

LB—the list of commands which WP has identified.

SpW2. WP enters objects and simple situations in the tree TOS as follows:

SpW2.1. When WP notices, by sensors and the observing operation observ(O1r, ... ), an object O1r (direct) in a structured object Q (which is recognized as M(Q), in TOS) then:

i. WP searches for an internal representation, O1, of the object O1r. WP attempts to identify O1as an object model M(O) (by the operation ldO(O1,M(O)), s, (ii)) such that M(O) is declared in the model M(Q) or in a model clo(M(Q)) or M(O) occurs in a list exOSa(AVe,su-akej) in the list LOSa(Q) (of the object Q); if this succeeds then O1 is recognized as expected object M(O). If such identification does not succeed then WP searches for object model M(Og), representing O1, in the semantic graph SeG (defined in Sect. 2.2). In this case, O1 is recognized as an unexpected (not foreseen) object M(Og) in Q. WP does the following operations: (a) it puts new object (P(VR(O1)),O1,M(O),., 'exp'), or (P(VR(O1)), O1,M (Og),., 'nexp'), in the lists apOS(Q) and nOS(Q), it builds the node KTOS(O1) and connects it as successor with KTOS(Q); (b) it puts the element EbOa(Q)=((t,.)Q,M(Q), Lexac(Q),nil) in LbOa(O1), where Lexac(Q)=nil if O1 does no activity in Q, and Lexac(Q)=(AVo1, s-acto1j,t,., P(exOSa(AVo1, s-acto1j)), P(apOSa(AVo1,s-acto1))) if O1 does sub-activity s-acto1j of the activity AVo1; in the latter case (thus if s-acto1j=(O1, ... )). WP puts new element EOSa(O1)=(O1,P(exOSa(AVo1, s-acto1j)), P(apOSa(AVo1,s-acto1j)),nil,nil) in the list LOSa(Q); (c) if object M(O), or M(Og), occurs in a list exOSa(AVqe, s-akqej), in LOSa(Q), then WP puts (P(VR(O)),O1, ... ) in the lists nOSa(AVqe,s-akqej) and apOSa(AVqe,s-akqej) (in LOSa(Q));

ii. The mentioned identification operation ldO(O1,M(O)) instantiates the model M(O) and builds from it the internal representation O1 of the observed object O1r according to the following rules: (a) when WP notices that a property or an object (if O1 is a structured object), EOi, of the model M(O), does not appear in the observed real object O1r, then EOi does not occur in the instantiation O1 of the model M(O) (if EOi is an object, M(U), which should appear in O1r with probability greater than 0.75, then WP puts M(U) in nfOS(O) and fOS(O1) (in node KTOS(O1)) as absent object), (b) when the properties and objects EOe, e≦e1, of the object O1r, noticed by WP, sufficient good match those of the model M(O), then O1r is recognized as instantiation O1 of the model M(O) (EOe are of course entered in O1), (c) the properties and objects, EOnb, which occur in the model M(O) and which WP does not notice in the real object O1r (because e.g they are not visible), WP puts into the instantiation O1 and marks them (in O1) with 'nver' (not verified); the not verified objects in O1 WP does not put in the lists apOS(O1), nOS(O1) etc of KTOS(O1).

iii. WP detects whether new simple situations have appeared in the following way:

iii.1. If O1 is recognized as expected object (s. (i)), then WP searches, through all simple situations, declared in M(Q) or in a model clo(M(Q) or in a list exOSa(AVqe,s-akqej) (in LOSa(Q)), for a model SMi such that SMi contains model M(O) as a component; if SMi is such situation model, then WP detects an instantiation, S1i, of the model SMi (performed by ldS(S1i,SMi)). If such instantiation S1i is found then S1i is an expected/foreseen situation (recognized as SMi) in object Q.

iii.2. If O1 has appeared as unexpected object in Q then WP searches, in the semantic graph SeG, for a simple situation model SMgi such that: SMgi contains object M(Og), as a component, and an instantiation, S1i, of SMgi (performed by ldS(S1i,SMgi)) exists in Q. If such instantiation S1i is found in object Q, then S1i is an unexpected/unforeseen situation (recognized as SMgi) in object Q.

iii.3. WP puts just recognized simple situations (P(VR(S1i)), S1i,SMi,., 'exp'), or (P(VR(S1i)),S1i,SMgi,., 'nexp'), in the lists apOS(Q) and nOS(Q). If situation SMi (or SMgi) occurs in a list exOSa(AVqe,s-akqej) (in LOSa(Q)), then WP puts (P(VR(S1i)),S1i, ... ) in the lists nOSa(AVqe, s-akqej) and apOSa(AVqe,s-akqej) (in LOSa(Q)).

SpW2.2. When WP observes by the operation observ that an object O1 (e.g. aS), recognized as M(O), moved from structured object Q1 (recognized as M(Q1)) to structured object Q2 (recognized as M(Q2)) (thus, O1 left object Q1 and appears in object Q2), then:

i. WP searches for simple situations, S1vi recognized as SMvi, such that: (a) (.,S1vi,SMvi,.,.) is in the list apOS (Q1) and contains object O1 as a component, (b) S1vi is recognized, by ldS(S1vi,SMvi), as 'is not in Q1'. WP puts (.,O1,M(O), . . . ) and the said disappeared situations (S1vi,SMvi, . . . ) into dOS(Q1) and deletes them in apOS(Q1). If (.,O1,M(O), . . . ), or (.,S1vi,SMvi, . . . ), occurs in a list apOSa(AV1e,su-ak1ej) (in LOSa(Q1)), then WP puts (O1,M(O), . . . ) ((S1vi,SMvi, . . . ), respectively) in the list dOSa(AV1e,su-ak1ej) (in LOSa (Q1)). When O1 does a sub-activity, su-akor, of an activity AVo (i.e. if EOSa(O1)=(O1,P(exOSa(AVo,su-akor)), P(apOSa(AVo,su-akor)), . . . ) is in LOSa(Q1), then:

begin E2:=EOSa(O1); delete EOSa(O1) in the list LOSa (Q1); ZOSa(Q1):=E2;

put ZOSa(Q1) and the actual time t in the list EbOa(O1) (in the list LbOa(O1)) end. Delete the pointer P(KTOS(Ol)) in sK(Q1) (thus, KTOS(O1) ceased to be successor of KTOS (Q1)).

ii. As said in (i), object O1 was recognized as M(O) in object Q1, WP recognizes O1 in object Q2 as follows:

Case a: in M(Q2) or clo(M(Q2)) or in a list exOSa(AV2i, su-ak2ij) (in LOSa(Q2)) is declared a model M(Or) such that M(Or) belongs to class M(O) (in graph SeG) and M(Or) is a good model for object O1: then O1 is an expected object in object Q2 and is recognized as M(Or).

Case b: M(O) or clo(M(O)) is declared in M(Q2) or in clo(M(Q2)) or in a list exOSa(AV2i,su-ak2ij) (in LOSa (Q2)): then O1 is an expected object in object Q2 and is recognized as M(O).

Case c: neither case (a) nor case (b) (i.e. in clo(M(Q2)) is no good model for object O1); then O1 is an unexpected object in object Q2 and is recognized as M(O).

WP puts (.,O1,M(Or), . . . 'exp') or (.,O1,M(O), . . . , 'exp') or (.,O1,M(O), . . . , 'nexp') in the lists apOS(Q2) and nOS(Q2). If M(Or) (or M(O)) occurs in a list exOSa (AV2n,su-ak2nj), in LOSa(Q2), then WP puts (.,O1,M (Or), . . . ), (or (.,O1,M(O), . . . )) in the lists apOSa (AV2n,su-ak2nj) and nOSa(AV2n,su-ak2nj) (in LOSa (Q2)). WP puts the pointer P(KTOS(O1)) in sK(Q2) (thus KTOS(O1) is successor of KTOS(Q2)). When O1 does a sub-activity su-akor of an activity AVo (i.e. if element EOSa(O1) was in LOSa(Q1)), then begin put new element EbOa(Q2)=(t,.Q2,M(Q2),Lexac (Q2),nil) in the list EbOa(O1), where Lexac(Q2)=(AVo,su-akor,t,.,P(exOSa(AVo,su-akor)),P (apOSa(AVo,su-akor)));

EOSa(O1):=E2; (s, (i)); put element EOSa(O1) in the list LOSa(Q2) end.

iii. WP performs analogous operations as in (iii), in SpW2.1.

SpW3. WP identifies simple sentences (their syntax and semantics) of the language which aS uses to communicate with people, emotional systems and robots/agents. An idea of such identification, based on object and situation models in the graph SeG, is given in Schurmann [AS4]. WP puts identified orders in the list LB.

SpW4. WP identifies simple motion actions of objects; examples: rolling ball, falling plate, eating person, walking Person. WP identifies such motion actions by motion patterns. These motion actions must be registered in object models. Also the possible results of motion actions must be given in their models/descriptions.

SpW5. WP observes these objects and simple situations, OS, (by an observation activity observ(.,OS,t)) which have the greatest value des(aS,AUw(OS),t) (the intensity of desire for attention when WP perceives OS by sensors, at time t). WP and the method DKA apply the rules given in Schurmann [AS6], which concern the changes of values bef(aS AUw(OS),t), des(aS,AUw(OS),t), bef(aS,NEw(OS),t) and des(aS,NEw(SO),t), when object or situation OS is recognized, where NEW(OS) is the need for curiosity and knowledge with respect to OS. WP applies also the rule AU3 (given in [AS6]), when aS does motion activities. When the attention of WP is focused on part TUr of real surrounding, then WP compares TUr with its representation, TU, in the tree TOS, WP recognizes changes of position and shape of an object O In TUr and puts them in TU. WP detects also whether situation, S(O), which contains object O, has changed. WP updates the modified or new situation S(O') in TU, where situation S(O) differs from situation S(O') if they have different situation models.

5. Determination and Control of Activities of aS

In this section I describe the method DKA which is applied in the sub-system DA of aS. To describe this method more clear, I assume that aS is not a virtual system and contains the following simultaneous working processors: at least one processor, PrWP, for the subsystem WP, at least one processor. PrDA, for the sub-system DA, at least one processor, PrA, for the subsystem EX-contr-motion (execution of motions), some processors, PrCOi, i=1, . . . ip, for computer operations which aS can execute, e.g. cognitive procedures.

5.1. Notation

We use the notations introduced in the previous sections. Additional we denote:

ZuA(AV)=(AV, Pb, SMae, xa, P(Ly,Ely), tact, tsa, su-act (SM,SMj), motak, exOSa(AV,su-act(SM,SMj)), apOSa (AV,su-act(SM,SMj)), apSa(AV,su-act(SM,SMj)), . . . )—the state of execution of activity AV, where: SMae—the initial situation in which the execution of the activity AV began, Pb—pointer to command, BOf, in the list LB when AV performs order BOf, Pb=nil otherwise, su-act(SM,SMj)—the execution of the activity AV reached situation SM and now this sub-activity is performed, xa='exe' when the sub-activity su-act(SM,SMj) is being executed, xa='inter' when the execution of this sub-activity (thus also the activity AV) is actually interrupted, P(Ly,Ely)—pointer to element Ely in the list Ly, where Ly denotes one of the following lists: PAH, LCMR, LuA, LuCO, LuMR; if Ly=PAH (or Ly=LCMR) then the sub-activity su-act(SM,SMj) is being executed by the processor PrA, i.e. by the sub-system Ex-contr-motion, (by a processor PrCOi, a machine, a robot/agent or an emotional system, respectively);

tact (tsa)—the time period of execution of the activity AV (the sub-activity su-act(SM,SMj), respectively), motak—the intensity of motivation to execute activity AV, exOSa(AV,su-act(SM,SMj)) (apOSa(AV,su-act(SM, SMj)))—the list of objects and simple situations which can appear (have appeared and are listed in exOSa(AVh, su-akh), respectively) when sub-activity su-act(SM, SMj) is executed, apSa(AV,su-act(SM,SMj)—the list of situations which have appeared and are expected in su-act(SM,SMj);

PAH=(H1,H11,H2, . . . ) registers as follows the state of execution of a sub-activity or control-activity by processor PrA: H1=nil if PrA is free, H1=P(Lexint, ZuA(AV)) and H2='act' if PrA is executing su-act(SM,SMj), H5='end' if PrA finished the sub- or control-activity registered in H1, if H1=P(Lexint,ZuA(AV))) and H2='co-a' then PrA is executing the control-activity contr-su-actj of the sub-activity in ZuA(AV); in this case holds: in H11 is the pointer to the elementary activities in contr-su-actj which PrA is now executing, if H3='ei-ak1' then PrA is doing the elementary activities OApj1; ... ;OApja (before observ( ... )) (if these activities are finished then H5='end'), if H3='obser' then observ( ... ) is being executed and in H4 is the time at which the operation observ( ... ) began, if H3='c-akt' then a control action CAje is being executed;

Lexint—the list of activity states ZuA(AVp), for activities which actually are executed or interrupted;

LCMR—the list of activities being actually executed by a processor PrCOi, a machine, an agent/robot or an emotional system; ECMR(AVy)=(P(Lexint,ZuA(AVy)), Mas, Resyj) is an element of this list, where Mas is the object which does the sub-activity in ZuA(AVy) and Resyj denotes the resources which are used by the sub-activity in ZuA(AVy);

LuA—the list of pointers P(Lexint,ZuA(AVai)) to ZuA (AVai) (in Lexint) such that the sub-activity in ZuA(AVai) is waiting for execution by the processor PrA;

LuCO—the list of pointers P(Lexint,ZuA(AVci)) to ZuA (AVci) such that the sub-activity in ZuA(AVci) is waiting for execution by a processor PrCOn;

LuMR—the list of pointers P(Lexint,ZuA(AVri)) to ZuA (AVri) such that the sub-activity in ZuA(AVri) is waiting for execution by a machine, an agent/robot or an emotional system; EuMR(AVri)=(P(Lexint,ZuA(AVri)), Resrj) is an element of this list, where Resrj denotes the resources which the sub-activity in ZuA(AVri) needs;

LAst—the list of activities waiting for start of execution.

The execution of a sub-activity, su-acj, or control-activity, contr-su-actj, by the processor PrA (which can use several processors) is performed and controlled by a software Ex-contr-motion. Ex-contr-motion performs and controls the motion activities of aS. The performance of motions by Ex-contr-motion is not subject of this patent description. How such software can be developed is described in Meystel & Albus [MeA] (2002); thereby, motion patterns, for standard motions, and surface and spatial patterns, where these motion patterns are applied, should be used.

To make the description of the method DKA more clear, I give first (in Sect 5.2) the structure of the method and after that a more detailed general description. In Sect. 5.3, I give the complete description of the method DKA.

5.2. General Outline of the Method DKA

DKA consists of the following steps:

D1.1. build list LdmS (with elements dmS(Q)) of meta-situations which are disappeared from the surrounding represented by TOS, where Q is a structured object; delete disappeared objects and situations in TOS;

D1.2. build list LS1 of situations which have appeared in connection with activities which are being executed or interrupted;

D1.3. build list LS2 of situations which just have appeared in structured objects in TOS;

D1.4. initiate the performance of received commands—for commands to execute an activity, AVf, put AVf in the list LAst of activities which should be executed;

D1.5. build list LnexS of objects and situations which have appeared in structured objects in TOS, although they are not expected/not foreseen there;

D1.6. build list LOSf of objects and situations just recognized as absent/missed in structured objects in TOS, although they should be there;

D2. initiate the execution of these activities in the list LAst (s. D1.4) which have great enough priorities and the resources needed for their executions are available;

D3. control the execution of sub-activities as follows:

D3.1. when processor PrA executes control-activity of a sub-activity, then update the state of this execution;

D3.2. control sub-activities, suAyj, listed in LS1 (s. D1.2) as follows: determine new sub-activity and initiate its execution or close the execution of the activity in which the sub-activity suAyj occurs, when the execution of the sub-activity suAyj is finished;

D3.3. if the duration of execution of a sub-activity lasts too long then abandon the execution of the activity in which this sub-activity occurs;

D4. control and determine execution of activities which are being executed or interrupted as follows:

D4.1. when the duration of execution of an activity lasts too long then abandon this execution;

D4.2. choose from activities in the list LuA, which are waiting for execution by the processor PrA, the activity, AVg, with maximum motivation; if this motivation is greater than the motivation connected with the sub-activity or control-activity, su-contr-acj, actually being executed by the processor PrA, then interrupt the execution of su-contr-acj and begin to continue the execution of the activity AVg;

D4.3. choose from activities in the list LuCO, which are waiting for execution by a processor PrCOn, activities, AVg1, ... ,AVgv, such that the motivation to execute activity AVgi (in the actual state of execution ZuA(AVgi)) is greater than the motivation to execute activity AVji actually being executed by a processor PrCOki, for i=1, ..., v, where AVji=nil if processor PrCOki is free; interrupt the execution of activities AVj1, ... ,AVjv and begin to continue the execution of activities AVg1, ... ,AVgv by processors PrCOk1, ... ,PrCOkv, D4.4. choose from activities in the list LuMR, which are waiting for execution by a machine, an agent/robot or an emotional system, activities, AVw1, ... ,AVwf, such that:

1) the present motivation to execute activity AVwi is relatively great;

2) either: (1) there are free resources (needed objects e.g. devices, machines, rooms) to continue the execution of the activity AVwi, or: (ii) (a) the motivation to execute activity AVwi is greater than the motivation to execute an activity AVsi actually being executed, (b) if the activity AVsi is interrupted, then there will be free resources for execution of the activity AVwi, (c) the activity AVsi can be interrupted;

for i=1, ... ,f do: begin if case (2.ii) then interrupt the activity AVsi; continue the execution of the activity AVwi end;

D5. for each situation, SMae, (in LS2) which has appeared in a structured object (in TOS) do: begin determine activity, AVp, with maximum motivation, which handle the situation SMae;

if such activity is determined and the motivation to execute the activity AVp is relatively great, then put (SMae, AVp) in the list LAst of activities which should be executed end;

D6. for each situation, SMgje, (in the list LnexS, s. D1.5), which has appeared in a structured object, Q, (in TOS) but is not foreseen there, determine an activity, AVgj, such that: it handles the situation SMgie, it can be executed in object Q and the motivation to execute it is great enough; put (SMgje, AVgi) in the list LAst;

D7. for objects and situations, OSfi, (in the list LOSf, s. D1.6) that have not appeared in structured objects, Q, (in TOS), although they should appear there do: begin determine an activity, AVgi, such that: it copes with the problem of absent/missed OSfi, it can be executed in object Q and the motivation to execute it is great enough; put (OSfi, AVgi) in the list LAst end;

D8. update the relevant lists in AW(t); apply the rule RWAN1 (s. Sect. 3.3) and the rules given in Schurmann [AS6], which should be applied every time period (e.g. AU1, GR3, MA4); store the most important objects and situations, with relevant lists, which are in AW(t), in AW(tμ) (μ:=μ+1), after every given time period; goto D1.1

More Detailed Outline of Steps D1.1, . . . ,D7

D1.1. for each non empty list dOS(Q) (the list of disappeared objects and simple situations in object Q, in TOS) do: begin dOS1(Q):=dOS(Q); dOS(Q):=nil;
  dmS(Q):=the list of disappeared meta-situations in object Q (they contain at least one object or one situation from dOS1(Q) as component;
  delete the meta-situations in amS(Q) (in KTOS(Q)), which are listed in dmS(Q);
  for objects and situations in the list dOS1(Q) and dmS(Q) do: begin determine new values bef(aS,b,t) and des(aS,b,t) (intensities of satisfactions and desires) caused by disappeared objects and situations listed in dOS1(Q) and dmS(Q), by applying the relevant rules given in Sect. 2.1 and Schurmann [AS6]; apply the relevant rules given in Schurmann [AS5], with respect to the said changes of values bef(aS,b,t) and des(aS,b,t), to update emotion intensities end end;

D1.2. LS1:=nil; using the lists LOSa(Q) and dmS(Q) in the tree TOS build lists:
  EnOSa2(AVh)—of objects and simple situations which just have appeared and are expected when the sub-activity in ZuA(AVh) is being executed;
  EdOSa2(AVh)—of objects and simple situations which appeared when the sub-activity in ZuA(AVh) has been executed, and which now have disappeared:
  nmSa(AVh)—of just appeared meta-situations which are expected when the sub-activity in ZuA(AVh) is being executed;
  dmSa(AVh)—of meta-situations which appeared when the sub-activity in ZuA(AVh) is being executed, and which now have disappeared;
  update the relevant lists in ZuA(AVh) using the lists EdOSa2(AVh) and dmSa(AVh);
  update the list apOSa(AVh) in ZuA(AVh) using the list EnOSa2(AVh), and after that, build the list ES1(AVh) (element of the list LS1) of just appeared situations which are expected in ZuA(AVh), using nmSa(AVh);

D1.3. LS2:=nil; for objects Q in the tree TOS, build list ES2(Q) (element of the list LS2) as follows: begin put each simple situation expected in Q and occurring in the list nOS(Q) (in the node KTOS(Q), marked with 'exp') into the list ES2(Q) in the following form:

$$ES2(Q)=(Q, M(Q), (as1,S11,SM1,ldS(S11,SM1),loc(S11)), \ldots ,(ask,S1k,SMk,ldS(S1k,SMk),loc(S1k))), \quad (5.1)$$

where: situations SMi are foreseen in structured object M(Q), object Q is recognized as M(Q), S1i is recognized as SMi, asi=('sf',SFi) if SMi belongs to situation sequence SFi (occurring in M(Q)), and asi=('mc',nil) if SMi does not belong to a situation sequence in M(Q), and loc(S1i) denotes the actual location of the situation S1i in VR(Q) (if S1i is a visual situation);
  detect meta-situations which just have appeared in Q and are expected in object M(Q), using the lists nOS1(Q), apOS(Q) and amS(Q), and put them into the lists ES2(Q) and amS(Q);
  apply the relevant rules, given in Sect. 2.1. in [AS6] and in [AS5], to update the relevant values bef(aS,b,t), des(aS,b,t) and other emotion intensities, with regard to the just appeared new meta-situations end;

D1.4. for each command, BOf, in the list LB of the received orders, do: begin
  increase the desires des(aS,WA(Pa),t) (to do orders received from Pa) and des(aS,AN,t) (for recognition acknowledgment and self-esteem) according to the rule RWAN2 (s Sect. 3.3);
  if BOf is an order, from authorized Pa, to abandon an (or to continue the execution of an abandoned) activity, AVg, then: begin abandon the (continue the execution of the abandoned, respectively) activity AVg;
  update bef(aS,WA(Pa),t), des(aS,WA(Pa),t), bef(aS,AN,t) and des(aS,AN,t) with regard to the order BOf from Pa; apply the relevant rules, given in Sect. 2.1, in [AS6] and in [AS5], to update the relevant values bef(aS,b,t), des(aS,b,t) and other emotion intensities, in the case "activity AVg has been abandoned—no goal situation of this activity will be reached" ("probably a goal situation of the activity AVg will be reached", respectively) end;
  if BOf is an order to execute an activity AVf then put the activity AVf in the list LAst of activities which should be executed end;

D1.5. for structured objects, Q, in the tree TOS, build elements EnexS(Q) of the list LnexS of not foreseen situations, as follows: begin
  put each not expected simple situation (marked with 'nexp') from nOS(Q) into the list EnexS(Q);
  using lists nOS(Q) and apOS(Q), detect all new meta-situations, mSge, such that: (a) at least one unexpected object or situation in nOS(Q) is a component of the meta-situation mSge, (b) mSge is recognized as model mSMge and mSMge is not foreseen in object M(Q); put (mSge,mSMge) in the list EnexS(Q);
  apply the relevant rules, given in Sect. 2.1. in [AS6] and in [AS5], to update the relevant values bef(aS,b,t), des(aS,b,t) and other emotion intensities, in the case "unexpected meta-situation mSge has appeared" end;

D1.6. for structured objects, Q, in the tree TOS, add new elements to the lists EOSf(Q) and fmS(Q) (of absent/missed meta-situations in object Q) as follows:
  begin EOSf(Q) (element of the list LOSf) has the form (Q,M(Q),ob (pr(Of1),M(Of1)), . . . ,(pr(Ofa),M(Ofa)); sit (pr(Sf1),SMf1), . . . ,(pr(Sfs),SMfs))
  where pr(Ofi), or pr(Sfe), (given in M(Q)) denotes the probability that object M(Ofi) (situation SMfe, respectively) appears in object Q—for these elements hold: pr(Ofi)>0.75, pr(Sfe)>0.75;
  using the absent/missed objects and simple situations registered in EOSf(Q) and fOS(Q) (the latter list is built by WP), recognize meta-situations, mSMfe, which are not in object Q, although they should appear there, and are not in the list fmS(Q);
  put these situations (pr(mSfe),msMfe) in the lists EOSf(Q) and fmS(Q) end;

D2. initiate the execution of activities in the list LAst as follows: for each activity, AVg, in the list LAst do:
  if (a) aS can reach an initial situation of the activity AVg by motions or by sending a message, (b) the resources for execution of the activity may be available, (c) the priority prior-a(.,AVg,t) of the activity AVg is great enough, compared with priorities prior-a(.,AVxw,t) of activities AVxw waiting for execution then begin build the initial execution state ZuA(AVg) of the activity AVg;
put ZuA(AVg) in the list Lexint; put the pointer to ZuA(AVg), in Lexint, into the relevant list (LuA, LuCO or LuMR) of activities waiting for execution;
apply the rule BZ1 given in [AS6] end else begin if AVg has to perform an order then issue a message explaining the reason why this order is not done till now end;

D3. control the execution of sub-activities as follows:

D3.1. when processor PrA executes a control-activity, contr-su-actj, then update the execution state of contr-su-actj;

D3.2. for each element ES1(AVy) in the list LS1 do: begin when the execution of the sub-activity, suAyj, occurring in ZuA(AVy) is finished then begin update the execution state ZuA(AVy);
if the execution of the activity AVy is finished then begin close the execution of the activity AVy;
put the reached end situation, SMyi, of the activity AVy, in the list LS2;
if AVy performed a command then apply the rule RWAN3 (s. Sect. 3.3);
apply the relevant rules, given in Sect. 2.1, in [AS6] and in [AS5], to update the relevant values bef(aS,b,t), des(aS,b,t) and other emotion intensities, in the case "activity AVy is finished and the end situation SMyi has been reached" end else
begin apply the rules BZ2.1, BZ2.3, . . . given in [AS6], the rules in Sect. 2.1 and the relevant rules given in [AS5], to update the relevant values bef(aS,b,t), des (aS,b,t) and other emotion intensities, in the case "between situation SMyi of the activity AVy is reached"; determine the next sub-activity in AVy which should be executed;
if this next sub-activity contains a control-activity then put the pointer to this control-activity into the list LuA;
update ZuA(AVy) end end;

D3.3. sn:=sn+1; if sn>sn1 then begin
for each activity, AVy, being executed or interrupted do begin
if the duration of execution of the sub-activity in ZuA(AVy) lasts too long then begin
abandon the execution of this sub-activity and the activity AVy;
apply the relevant rules, given in Sect. 2.1, in [AS6] and in [AS5], to update the relevant values bef(aS,b,t), des(aS,b,t) and other emotion intensities, in the case "activity AVy is abandoned—none goal situation of this activity will be reached" end end end;

D4. control the execution of activities as follows:

D4.1. an:=an+1; if an>an1 then begin
for each activity, AVy, being executed or interrupted do begin if the duration of execution of the activity AVy lasts too long then begin abandon the execution of the activity AVy;
apply the relevant rules, given in Sect. 2.1, in [AS6] and in [AS5], to update the relevant values bef(aS,b,t), des(aS,b,t) and other emotion intensifies, in the case "activity AVy is abandoned—none goal situation of this activity will be reached" end end end;

D4.2 control the execution of sub- and control-activities by processor PrA as follows:
begin choose from activities in the list LuA, which are waiting for execution or control by the processor PrA, the activity, AVg, with the maximum motivation to execute its current sub- or control-activity, su-co-actgi, which is in ZuA(AVg);
if processor PrA is free then begin begin the execution of su-co-actgj by the processor PrA;
update ZuA(AVg) and the list LuA end else begin
let sub- or control-activity, su-co-act-vh, of an activity AVa, is being executed by processor PrA;
if the execution of su-co-act-vh can be interrupted then begin
if the motivation to execute su-co-actgi is greater than the motivation to execute su-co-act-vh then
begin interrupt the execution of su-co-act-vh; update ZuA(AVa) and the list LuA;
begin the execution of su-co-actgi by the processor PrA; update ZuA(AVg) and the list LuA end end end end;

D4.3. control the execution of activities by processors PrCOn as follows:
if LuCO≠nil then begin nex:=false; repeat
choose from activities in the list LuCO, which are waiting for execution by a processor PrCOn, activity, AVg, with the maximum motivation to execute its current sub-activity, su-actgi, which is in ZuA(AVg);
if a processor, PrCOf, is free then m:=f else begin choose from the set
{AVy|activity AVy (i.e. its current sub-activity, su-actye, which is in ZuA(AVy)) is being executed by a processor PrCOky and the sub-activity su-actye can be interrupted}
the activity, AVs, with the minimum motivation to execute its current sub-activity, su-actse;
if such activity AVs is chosen and the motivation to execute the sub-activity su-actgi is greater than the motivation to execute the sub-activity su-actse then begin interrupt the execution of the sub-activity su-actse (thus, also the activity AVs) by the processor PrCOks; m:=ks:
update ZuA(AVs) and the lists LuCO and LCMR end else nex:=true end;
if nex=false then begin begin the execution of the sub-activity su-actgi (of the activity AVg) by the processor PrCOm; delete the element with the pointer to ZuA (AVg), in the list LuCO:
update ZuA(AVs) and the lists LuCO and LCMR end
until nex=true v LuCO=nil end;

D4.4. control the execution of activities by a machine, robot, agent (Maxs) as follows:
LuM1:=LuMR (the list of activities waiting for execution by a Maxs);
while LuM1≠nil do begin choose, from activities in the list LuM1, activity, AVg, with the maximum motivation to execute its current sub-activity, su-actgi, which is in ZuA(AVg);
let the sub-activity su-actgj should be executed by Magj and let Resgj are the resources needed for execution of su-actgj;
if there are free resources Resgj and Magj is free then isf:=true else begin
find, in the list LCMR of activities actually being executed by objects, activity, AVs, such that (a) AVs, i.e. the sub-activity (su-actse) in ZuA(AVs), is actually being executed by Magj, if Magj is not free, (b) the motivation to execute the sub-activity su-actgj is greater than the motivation to execute the sub-activity su-actse, (c) the execution of the sub-activity su-actse can be interrupted at present time, (d) if the execution of the sub-activity su-actse is interrupted then there will be free Magj and the resources Resgj (for execution of the sub-activity su-actgj);

if such activity AVs is found then begin isf:=true:
  interrupt the execution of the sub-activity su-actse (thus, also the activity AVs);
  update ZuA(AVs) and the lists LuMR and LCMR end else isf:=false end;

if isf=true then begin begin the execution of the sub-activity su-actgj (of the activity AVg) by Magj;
  delete the element EuMR(AVg) in the list LuMR, and update ZuA(AVg) and LCMR end; delete the element EuM1(AVg) in the list LuM1 end;

D5. handle each foreseen situation which has appeared in a structured object, Q, and is registered in the list LS2 (built in D1.3 and D3.2) as follows:
for each element ES2(Q)=(Q,M(Q),(as1,Sa1,SMa1,.,.), . . . ,(ask,Sak,SMak,.,.)) in LS2 (s. (5.1)) do:
  begin for each situation SMae in ES2(Q) do: begin
    if SMae belongs to a situation sequence, FSh, then register in FSh that SMae has appeared;
    find activity, AVp, in AK(SMae), with the greatest motivation such that: (a) the resources needed for execution of the activity AVp could be available, (b) AVp can be executed in object Q, (c) the motivation to execute AVp is great enough;
    if such activity AVp is found then begin put (SMae,AVp) in the list LAst of activities which should be executed; delete (ase,Sae,SMae,.,.) in ES2(Q) end end end;

D6. handle not foreseen situations which have appeared in structured objects in TOS and are registered in the list LnexS (s. D1.5) as follows:
for each element EnexS(Q)=(Q,M(Q),(as1,Sa1,SMa1,.,.), . . . ,(ass,Sas,SMas,.,.)) in LnexS do:
  begin determine activities, AVgj, j=1, . . . ,w, such that: (a) a situation, SMgje, in EnexS(Q) is initial situation of the activity AVgj, (b) AVgj can be executed in object Q, (c) the motivation to execute AVgj is great enough, (d) the resources needed for execution of AVgj may be available;
  put these activities (SMgje,AVgj), j=1, . . . ,w, in the list LAst to execute them end;

D7. handle objects and situations, in the list LOSf (with elements EOSf(Q), s. D1.6), which are not appeared in structured objects in TOS, although they should be there, as follows:
for each element EOSf(Q)=(Q,M(Q), ob (pr(Of1),M (Of1)), . . . ,(pr(Ofa),M(Ofa)); sit (pr(Sf1),SMf1), . . . , (pr(Sfd),SMfd)) in LOSf do: begin build the following situations:
  SOfi:=object M(Ofi) is not appeared in object Q, although it should be there with probability pr(Ofi), for i=1, . . . , a;
  SMFe:=situation SMfe is not appeared in object Q, although it should be there with probability pr(Sfe), for e=1, . . . ,d;
  increase the attention to situations SOfi, i=1, . . . ,a, and SMFe, e=1, . . . ,d, according to the relevant rules given in [AS6]; apply the relevant rules, given in Sect. 2.1. in [AS6] and in [AS5], to update the relevant values bef(aS,b,t), des(aS,b,t) and other emotion intensities, with regard to the appeared situations SOfi, i=1, . . . ,a, and SMFe, e=1, . . . ,d;
  WSF:={SF|SF=SOfi, i≦a, and |rosa(aS,SOfi,t)|>10 or SF=SMFe, e≦d, and |rosa(aS,SMFe,t)|>10} (situations which are not in WSF are unimportant for aS);
    determine activities, AVgi, i=1, . . . ,w, such that: (a) a situation, SFgij, in WSF, is an initial situation of the activity AVgi, (b) AVgi can be executed in object Q, (c) the motivation to execute AVgi is great enough, (d) the resources needed for execution of AVgi may be available;
  put these activities (SFgij, AVgi), i=1, . . . ,w, in the list LAst, to execute them end;

5.3. Complete Description of the Steps D1.1, . . . ,D7

D1.1. for each structured object, Q, in the tree TOS build lists: begin
  nOS1(Q):=nOS(Q); nOS(Q):=nil (in KTOS); dOS1(Q):=dOS(Q); dOS(Q):=nil;
  EOSf(Q):=nfOS(Q) (EOSf(Q) is new element of the list LOSf); nfOS(Q):=nil; for elements EOSa(Masi) of the list LOSa(Q), build elements: begin
    nOSa1(AVh,su-akhj):=nOSa(AVh,su-akhj); nOSa(AVh,su-akhj):=nil (in EOSa(Masi));
    dOSa1(AVh,su-akhj):=dOSa(AVh,su-akhj); dOSa(AVh,su-akhj):=nil;
    EOSa1(Q,Masi)=(nOSa1(AVh,su-akhj), dOSa1(AVh,su-akhj) end;
  for each list dOS1(Q) (of disappeared objects and simple situations in Q) do: build list dmS(Q) of disappeared meta-situations, mSMds, in object Q using the lists dOS1(Q) and amS(Q) (mSMds must have at least an object or a situation, listed in dOS1(Q), as component, and mSMds must be registered in the list amS(Q) and recognized by the procedure ldmS as not present in Q);
  delete these meta-situations in the list amS(Q), which are in dmS(Q);
  for objects, Odi, and situations, SMde, in the lists dOS1(Q) and dmS(Q) do: begin
    decrease the attention and the desire for curiosity with regard to Odi and SMde, i.e. decrease the values des(aS,AUw(Odi), t), des(aS,AUw(SMde),t), des(aS,NEw(Odi),t), des(aS,NEw(SMde),t), according to relevant rules in [AS6];
  apply the relevant rules, given in Sect. 2.1, in [AS6] and in [AS5], to update the relevant values bef(aS,b,t), des(aS,b,t) and other emotion intensities, in the case "object Odi, or situation SMde, is disappeared from object Q" (examples of such rules in [AS6]: MA3.1.1, MA3.2.1, MA3.3.1) end;

D1.2. LS1:=nil; for each list LOSa(Q) in the tree TOS do: begin
  using the lists nOSa1(AVh,su-akhj) and dOSa1(AVh,su-akhj) in the lists EOSa1(Q,Masi), and the lists dmS(Q) n TOS, build lists: begin
  EnOSa2(AVh)—of just appeared objects and simple situations (with the time point of identification by WP) which are expected when the sub-activity su-akhj, which is in ZuA(AVh), is being executed;
  EdOSa2(AVh)—of objects and simple situations which appeared when the sub-activity su-akhj, which is in ZuA(AVh), is being executed, and which now have disappeared;
  dmSa(AVh)—of meta-situations which appeared when the sub-activity su-akhj is being executed, and which now have disappeared (meta-situations in this list are in the list apSa(AVh,su-akhj), in ZuA(AVh), and in a list dmS(Q));
  nmSa(AVh)—of new appeared meta-situations (with the time point of identification) which are declared as expected in the sub-activity su-akhj (these meta-situations must contain as component at least one object or situation from EnOSa2(AVh)) end;
for elements EnOSa2(AVh), EdOSa2(AVh) and dmSa(AVh) do: begin
  mark these situations with 'was' (as was been), in the list apSa(AVh,su-akhj), which are in the lists EdOSa2(AVh) and dmSa(AVh);
  mark these objects and simple situations with 'was' (as was been), in the list apOSa(AVh,su-akhj) (in ZuA(AVh)), which are in the list EdOSa2(AVh);
  put all objects and situations from EnOSa2(AVh) into apSa(AVh,su-akhj) and mark them with 'is';
  ES1(AVh):=the list of new situations which have appeared when the sub-activity su-akhj (in ZuA(AVh)) is being executed, and which are expected in su-akhj— each situation in ES1(AVh) is either in EnOSa2(AVh) or in nmSa(AVh), and is foreseen in su-akhj (ES1(AVh) is an element of the list LS1);
  put all situations from the list ES1(AVh) into the list apSa(AVh) (in ZuA(AVh)) end end;

D1.3. LS2:=nit; build lists ES2(Q) (elements of the list LS2) of just appeared and expected situations in structured objects, Q, as follows: begin
  put all new simple situations which are expected in M(Q), from the list nOS1(Q) (expected situations are marked with 'exp') into the list ES2(Q), as given in (5.1);
  using the lists nOS1(Q), apOS1(Q) and amS(Q) detect (using the procedure ldmS) new appeared meta-situations, mSMne, such that mSMne contains at least one object or simple situation from nOS1(Q) as component and mSMne is not in amS(Q); if such situation mSMne is recognized then put mSMne in the lists ES2(Q) and amS(Q);
  delete these object and situation models in fOS(Q), EOSf(Q) and fmS(Q), which are in nOS1(Q) and ES2(Q);
  for objects, O1i, in nOS1(Q) and situations, S1e, in ES2(Q) do: begin increase the attention and the desire for curiosity with regard to O1i and S1e, i.e. increase the values des(aS,AUw(O1i),t), des(aS,AUw(S1e),t), des(aS,NEw(O1i),t), des(aS,NEw(S1e),t), according to the relevant rules in [AS6];
  apply the relevant rules, given in Sect 2.1, in [AS6] and in [AS5], to update the relevant values bef(aS,b,t), des(aS,b,t) and other emotion intensities, in the case "object O1i, or situation S1e, is appeared in object Q" end end;

D1.4. for each command, BOf, in the list LB of received orders do: begin
  if order BOf is given from an authorized person or system, Pa then begin
    des(aS,WA(Pa),t):=min(des(aS,WA(Pa),t)+1.5*(wg(BOf)+2.5*ag(Pa)), 18*ag(Pa));
    des(aS,AN,t):=min(des(aS,AN,t)+1.5*(wg(BOf)+2.5*ag(Pa)), 18*ag(Pa));
    where WA(Pa), wg(BOf) and ag(Pa) are explained in Sect 3.3 end;
  if BOf is an order, from authorized Pa, to abandon the execution of an activity, AVg (s. rules RPa1, RPa2 in Sect. 3.3) then begin abandon the execution of the activity AVg:
    put (BOf, ZuA(AVg), . . . ) in the list LabAo of abandoned activities (by a command);
    delete ZuA(AVg) in Lexint and update the relevant list PAH, LCMR, LuA, LuCO, LuMR;
    bef(aS,WA(Pa),t):=min(bef(aS,WA(Pa),t)+wg(BOf)+2.5*ag(Pa), 8.5*ag(Pa)) (s. Sect. 3.3);
    des(aS,WA(Pa),t):=max(des(aS,WA(Pa),t)−1.9*(wg(BOf)+2.5*ag(Pa)), 1.6*ag(Pa));
    bef(aS,AN,t):=min(bef(aS,AN,t)+(wg(BOf)+2.5*ag(Pa)), 8.5*ag(Pa));
    des(aS,AN,t):=max(des(aS,AN,t)−1.9*(wg(BOf)+2.5*ag(Pa)), 1.6*ag(Pa));
    apply the relevant rules, given in Sect. 2.1. in [AS6] and in [AS5], to update the relevant values bef(aS,b,t), des(aS,b,t) and other emotion intensities, in the case "activity AVg is abandoned—no goal situation of this activity will be reached" end
  else begin if BOf is an order, from authorized Pa, to continue the execution of an abandoned activity, AVg, which is registered in the list LabAo or LabD then begin
    put ZuA(AVg) from the list LabAo or LabD into the list Lexint,
    update ZuA(AVg) and put the pointer P(Lexint,ZuA(AVg)) to ZuA(AVg), in Lexint, into the relevant list LuA, LuCO or LuMR (of interrupted activities waiting for execution);
    bef(aS,WA(Pa),t):=min(bef(aS,WA(Pa),t)+wg(BOf)+2.5*ag(Pa), 8.5*ag(Pa)) (s. Sect. 3.3);
    des(aS,WA(Pa),t):=max(des(aS,WA(Pa),t)−19*(wg(BOf)+2.5*ag(Pa)), 1.6*ag(Pa));
    bef(aS,AN,t):=min(bef(aS,AN,t)+(wg(BOf)+2.5*ag(Pa)), 8.5*ag(Pa));
    des(aS,AN,t):=max(des(aS,AN,t)−1.9*(wg(BOf)+2.5*ag(Pa)), 1.6*ag(Pa));
    apply the relevant rules, given in Sect. 2.1. in [AS6] and in [AS5], to update the relevant values bef(aS,b,t), des(aS,b,t) and other emotion intensities, in the case "activity AVg will be executed—a goal situation of this activity can be reached" end
  else begin if BOf is an order, from authorized Pa, to execute an activity, AVf then begin
    determine an initial situation, SMfae, of the activity AVf such that: (a) from SMfae can be reached a good goal situation of the activity AVf, i.e. motakt is relative great, where motakt is the result of the operation mot(aS,SMfae,AVf,t,motakt,pg,SMfg,t2,art,zv), (b) aS can reach the situation SMfae by some elementary (motion) activities OAfa1; . . . ;OAfar;
    if such initial situation SMfae is determined then put ('ord',BOf,Pa,AVf,SMfae,OAf1, . . . ,OAfr; . . . ) in the list LAst (the list of activities which should be executed)
    else inform Pa that no initial situation of the activity AVf is within reach at the present time end
  else inform Pa that "I" will not perform the command BOf end end end;

D1.5. for structured objects, Q, in the tree TOS, build lists EnexS(Q) (element of the list LnexS) of not foreseen situations in object Q as follows: begin LnexS:=nil;
  put each not foreseen simple situation, marked with 'nex', from the list nOS1(Q) into EnexS(Q);
  using the lists nOS1(Q) and apOS(Q), detect all new appeared meta-situations, mSge, such that: (a) at least one unexpected object or unexpected simple situation in nOS1(Q) is an essential component of meta-situation mSge, (b) mSge is recognized by the procedure ldmS as model mSMge and mSMge is not expected in the object model M(Q), (c) all components of the situation mSge have appeared in Q;
  apply the relevant rules, given in Sect. 2.1, in [AS6] and in [AS5], to update the relevant values bef(aS,b,t), des(aS,b,t) and other emotion intensities, in the case "new unexpected situation mSge is appeared in Q"; put the new recognized meta-situations (mSge,mSMge) into EnexS(Q) and amS(Q) (with 'nexp') end;

D1.6. in elements EOSf(Q) of the list LOSf are the recognized objects and simple situations which are not appeared in object Q, although they should be present in Q; let (s. D1.6 in Sect 5.2):

EOSf(Q):=(Q,M(Q),ob (pr(Of1),M(Of1)), . . . ,(pr(Ofa), M(Ofa)); sit (pr(Sf1),SMf1), . . . ,(pr(Sfs),SMfs));

using the objects and simple situations in EOSf(Q) and fOS(Q), detect meta-situations, mSMfe, which are not appeared in Q, although they should be present in Q (according to the model M(Q)). and which do not occur in the list fmS(Q);

put these situations (pr(mSfe),mSMfe) (for pr(mSfe) >0.75) into the lists EOSf(Q) and fmS(Q);

D2. we use the procedure mot and functions introduced in Sect. 3.1 and 3.3: let function priority((SMae,AVy,t): real;

begin mot(aS,SMae,AVy,t,motacty,pc,SMc,t3,art,zv);

if $zv \leq -1.2$ min then priority:=-100000 else begin if activity AVy is not performing a command then priority:=motacty*4.5/sqrt(zv+16) else priority:=mot-ord (aS,BOf,AVy,SMae,Pa,t)*4.5/sqrt(t2-t-16), where t2=to+zt(BOf) and aS received the order BOf at time to end end;

initiate the execution of activities in the list LAst as follows: begin LAst1:=nil; for elements EAst(AVi) in LAst do begin if EAst(AVi)=('ord',BOfi,Pai,AV,SMaie, . . . ) then begin if $t2-t \leq -1.2$ min then begin because the execution of activity AV is behind time, ask Pai whether the activity AVi should be executed end else begin if the initial situation SMaie in EAst(AVi) can still be reached then EAst1(AVi):=EAst(AVi) where EAst1 (AVi) is element of the list LAst1 else begin detect new initial situation, SMain, such that aS can reach SMain by some motion activities OAin1, . . . ,OAinr and from SMain can be reached an acceptable goal situation by the activity AVi;

if such initial situation is detected then begin put SMain and OAinj, j=1, . . . ,r, in EAst(AVi);

EAst1(AVi):=EAst(AVi) end else begin inform Pai that, at present, no good initial situation of the activity AVi can be reached end end end end end;

while LAst1≠nil do begin choose activity, AVg, from LAst1, such that priority(SMgae,AVg,t)=max(priority(SMsai,AVs,t), for EAst1(AVs) in LAst1);

if the needed resources (also processor PrA and agents/ robots) for execution of activity AVg are not free then fr:=true else begin detect activities AVx1, . . . ,AVxm, in the list Lexint, such that (a) the sub-activities in ZuA(AVxi), $i \leq m$, are being executed now, (b) priority(SMgae,AVg,t) $\geq 1.1$*max(priority(SMxian,AVxi,t), for $i \leq m$), where SMxian is the initial situation at which the execution of AVxi began, (c) if the executions of the sub-activities in ZuA(AVxi), $i \leq m$, are interrupted, then the resources needed for execution of the activity AVg will be free;

if such activities AVxi, $i \leq m$, are determined then fr:=true else fr:=false end;

if fr=true then begin build the initial execution state, ZuA(AVg), of the activity AVg (e.g. put motactg in ZuA(AVg)) and put this state in the list Lexint, and put the pointer to ZuA(AVg) (in Lexint) into the relevant list LuA, LuCO,LuMR;

apply the rule BZ1 given in [AS6]: delete EAst1(AVg) and EAst(AVg) in the lists LAst1 and LAst end else delete EAst1(AVg) in LAst1 end end;

D3. control the execution of sub-activities in the list Lexint as follows:

D3.1. if processor PrA is executing a control-activity, contr-su-actyj, of a sub-activity in ZuA(AVy), i.e. in PAH are values H1=pointer to ZuA(AVy) in Lexint and H2='co-ac' then begin if H3='ei-ak1' then begin if H5='end' then begin H3:= 'obser'; H5:=nil; H4:=t; H11:=pointer to observ(tatyj, FOSMy,t) in contr-su-actyj end end else begin if H3='obser' then begin if H5='end-obs' (this value assigns to H5 the subsystem Ex-contr-motion, after execution of observ(tatyj, . . . )) then begin H3:='obs-sit'; H4:=t; H5:=nil end end else begin if H3='obs-sit' and t-H4>ctob then begin using the list apSa((AVy,su-act(.,.)) in ZuA(AVy) and ES1(AVy), find the first situation expression sitExpyje in contr-su-actyj which holds (i.e. the situation sitExpyje is appeared); H3:='c-akt'; H5:=nil; H11:=pointer to the elementary activities OAxyje1; . . . ;OAxyjef (in CAyje) in contr-su-actyj end else begin if H3='c-akt' then begin if H5='end' then begin (contr-su-actyj is performed) atyj:=O (in contr-su-actyj); PAH:=nil end end end end end end;

D3.2. for each element ES1(AVy)=(AVy, P(Lexint,ZuA (AVy)), (sy1,SMy1); . . . ,(Syp,SMyp)) of the list LS1 (s. D1.2), where Syi (recognized as SMyi, $i \leq p$) are just appeared situations which are expected when sub-activity, su-act(SMy,SMyj), in ZuA(AVy), is being executed, do:

if the execution of the sub-activity su-act(SMy,SMyj) is finished. i.e. a situation SMyi is successor (in the activity schema AVy) of the node SMy then begin update ZuA(AVy) in Lexint;

delete pointer P(Lexint,ZuA(AVy)) in the relevant lists PAH, LCMR, LuA;

if processor PrA is actually performing control-activity contr-su-actyj of this sub-activity then begin close this control-activity; PAH:=nil end;

if the execution of the activity AVy is finished then begin close the execution of the activity AVy;

put the reached final situation SMyi of the activity AVy in the list LS2, as given in D1.3;

if AVy performed a command and SMyi is a goal situation then apply the rule RWAN3 (Sect. 3.3);

apply the relevant rules, given in Sect. 2.1, in [AS6] and in [AS5], to update the relevant values bef(aS,b,t), des(aS,b,t) and other emotion intensities, in the case "activity AVy is finished and its final situation SMyi is reached";

delete the element ES1(AVy) in LS1 and ZuA(AVy) in Lexint end else begin apply the relevant rules, given in Sect. 2.1, in [AS6] and in [AS5], to update the relevant values bef(aS,b,t), des(aS,b,t) and other emotion intensities, in the case "between situation SMyi of the activity AVy is reached";

su-act(SMyi,SMy2e):=the next sub-activity of the activity AVy, which will be executed, such that motsu-act (SMyi,SMy2e,t)=max(motsu-act(SMyi,SMy2n,t), for each successor SMy2n of the node SMyi, such that the resources for execution of the sub-activity su-act(SMyi, SMy2n) will be available), (motsu-act is defined in Sect. 3.2);

update ZuA(AVy) in Lexint and put the pointer P(Lexint, ZuA(AVy)) in the relevant list LuA, LuMR or LuCO;
using the expected situations given in su-act(SMyi, SMy2e), build the list exOSa(AVy,su-act(SMyi, SMy2e)) of objects and simple situations which can appear when this sub-activity is being executed;
update the list EOSa(Mas2e) in the object Qx (if this list is not in Qx then build it) in which the object Mas2e is being, where Mas2e is the object (e.g. machine, agent, processor PrA) which will execute this sub-activity and EOSa(Mas2e) is element of the list LOSa(Qx);
if su-act(SMyi,SMy2e) contains control-activity contr-su-acty2e then begin aty2e:=0 (in contr-su-acty2e); put the pointer to contr-su-acty2e, in ZuA(AVy), into the list LuA end end end;
D3.3. control whether the duration of execution of a sub-activity lasts too long as follows:
sn:=sn+1; if sn>sn1 then begin
for each state ZuA(AVx) in Lexint do begin
if the sub-activity in ZuA(AVx) is executed (without interruptions) longer than ta2xj, where ta2xj is the maximum time period of execution of this sub-activity then begin
abandon the execution of this sub-activity and the activity AVx;
put ZuA(AVx) in the list LabD and delete ZuA(AVx) in Lexint;
update relevant lists PAH, LuA, LCMR, LuCO, LuMR end end end;
D4. control activities which are waiting for execution as follows:
D4.1. control whether the duration of execution of an activity lasts too long as follows:
an:=an+1; if an>an1 then begin
for each state ZuA(AVx) in Lexint do begin
if activity AVx is executed (without interruptions) longer than 1.3*tax, where tax is the time period needed for execution of this activity then begin
abandon the execution of the activity AVx;
put ZuA(AVx) in the list LabD and delete ZuA(AVx) in Lexint;
update relevant lists PAH, LuA, LCMR, LuCO, LuMR end end end;
D4.2. control sub- and control-activities registered in the list LuA, which are waiting for execution by processor PrA as follows:
let EuA(AVy)=(P(Lexint,ZuA(AVy)),axy, . . . ) be an element of the list LuA, where axy='act' if PrA should perform the sub-activity in ZuA(AVy), axy='co-a' if PrA should perform the control-activity in ZuA(AVy);
let, for elements EuA(AVy) in LuA,
mots-c-a(AVy,SMyi,SMyi,t)=motsu-act(AVy,SMyi,SMyi,t), if axy='act' (s. Sect 3.2)
=mot-cont(AVy,SMyi,SMyj,tyj,t), if axy='co-a'(s. end of Sect. 2.3)
where tyj denotes the duration of execution (without interruptions) of the sub-activity in ZuA(AVy), after the last control;
if the software Ex-contr-motion of the processor PrA has interrupted sub- or control-activity of an activity AVx (this information is in PAH) then begin put new element EuA(AVx) in LuA;
update ZuA(AVx) in Lexint; PAH:=nil end;
if processor PrA is free and LuA≠nil then begin choose the element EuA(AVg), from the following set MuA, with the maximum value mots-c-a(AVg,SMgi,SMgj,t), MuA={EuA(AVy)|the sub- or control-activity, s-c-ayj, in EuA(AVy), can be executed by the processor PrA (when aS, i.e. PrA, before executes some motion activities BAy1; . . . ;BAya) and the resources for execution of s-c-ayj are available};
let BAg1; . . . ;BAga are the mentioned motion activities which PrA has to perform before s-c-agj; register BAF=BAg1; . . . ;BAga;s-c-agj (for execution) in PAH (i.e. H2:=axg; H11:=the pointer to BAF; H5:= nil, etc.);
update ZuA(AVg) in Lexint and delete element EuA (AVg) in LuA end else
begin if LuA≠nil then begin choose the element EuA (AVg), from the following set MA1, with the maximum value mots-c-a(AVg,SMgi,SMgj,t),
MA1={EuA(AVy)|the sub- or control-activity, s-c-ayj, in EuA(AVy), can be executed by the processor PrA (when aS, i.e. PrA, before executes motion activities BA1; . . . ;BAya) and the resources for execution of s-c-ayj will be available if the sub- or control-activity (su-co-actaw in ZuA(AVa)), which actually is being performed by PrA, is interrupted);
if mots-c-a(AVg,SMgi,SMgj,t)>1.35*mots-c-a(AVa, SMav,SMaw,t) then begin order the software Ex-contr-motion (in PrA) to interrupt the execution of su-co-actaw end end end;
D4.3. control sub-activities, registered in LuCO, waiting for execution by a processor PrCOn as follows:
begin if LuCO≠nil then begin nex:=false;
repeat choose element EuCO(AVg), from the list LuCO, with the greatest value motsu-act(AVg,SMgi,SMgj,t) (motsu-act is defined in Sect. 3.2), where su-act(Smgi, SMgj) is in ZuA(AVg);
if a processor PrCof (1≦f≦ip) is free then m:=f else begin choose element ECMR(AVs), from the following set MC, with the minimum value motsu-act(AVs,SMse, SMsv,t)
MC={ECMR(AVy) is in LCMR|ECMR(AVy)=(P(Lexint, ZuA(AVy)), PrCOn, 'activ', . . . ), 1≦n≦ip, and the sub-activity su-act(SMye,SMyv) (in ZuA(AVy)) can be interrupted};
if such element ECMR(AVs) is chosen and motsu-act (AVg,SMgi,SMgj,t)>1.15*motsu-act(AVs,SMse, SMsv,t) then begin interrupt the execution of the sub-activity su-act(SMse,SMsv) being executed by the processor PrCOm, where ECMR(AVs)=(.,PrCOm, 'activ', . . . );
delete the element (P(Lexint,ZuA(AVs)), 'co-a') in LuA or PAH, if such element is there;
delete element ECMR(AVs) in LCMR and put the pointer P(Lexint,ZuA(AVs)) in the list LuCO;
update ZuA(AVs) in Lexint and update the node KTOS (PrCOm) end else nex:=true end:
if nex=false then begin put the element (P(Lexint,ZuA (AVg)), PrCOm, 'activ', . . . ) in LCMR;
delete the element EuCO(AVg) in LuCO and update the node KTOS(PrCOm);
if the sub-activity in ZuA(AVg) contains control-activity then put the element (P(Lexint,ZuA(AVg)), 'co-a') in the list LuA;
update ZuA(AVg) in Lexint and begin to execute the sub-activity in ZuA(AVg) by the processor PrCOm end end until nex=true or LuCO=nil end end:
D4.4. control sub-activities registered in the list LuMR, waiting for execution by an object, Maxj, (machine, robot, agent, emotional system), as follows: begin LuM1:=LuMR;

for each Element ECMR(AVx) in LCMR do begin
if ECMR(AVx)=(.,Maxj, 'interup-st', . . . ) (i.e. when Maxj received, from DKA, order "interrupt the sub-activity which is in ZuA(AVx)") then begin
if in the list ES2(Maxj) or amS(Maxj) or apOS(Maxj) (in node KTOS(Maxj)) is the state "Maxj has interrupted the sub-activity, sub-acxj, (which is actually in ZuA (AVx))" then begin
delete the control-activity, given in sub-acxj, in the relevant list PAH or LuA;
put EuMR(AVx) in LuMR and delete ECMR(AVx) in the list LCMR;
update ZuA(AVx) and put the engagement state 'free' in node KTOS(Maxj);
mark the resources, Rxve, which were used by the sub-activity sub-acxj as 'free' end end end;
while LuM1≠nil do begin choose the element EuM1 (AVy)=(P(Lexint,ZuA(AVg)),Magj, . . . ), from the list LuM1, with the maximum value motsu-act(AVg,SMgi, SMgj,t);
let Resgj are the resources needed for execution of the sub-activity su-act(SMgi,SMgj);
if object Magj is free and resources Resgj are free then begin put element ECMR(AVg)=(P(Lexint,ZuA (AVg)),Magj, 'activ', . . . ) in LCMR;
if su-act(SMgi,SMgj) contains control-activity then put (P(Lexint,ZuA(AVg)), 'co-a', . . . ) in LuA;
for objects Rgje in Resgj, update KTOS(Rgje)—e.g. engagement state:='engag';
update ZuA(AVg) in Lexint, and delete the elements EuMR(AVg) in LuMR and EuM1(AVg) in LuM1;
update KTOS(Magj)—e.g. engagement state:='engag-activ';
begin the execution of the sub-activity su-act(SMgi, SMgj) by the object Magj end else
begin if in LCMR is no element (.,Magj, 'interup-st', . . . ) then begin
search for element ECMR(AVs)=(p(Lexint,ZuA(AVs)), Magj, 'activ', . . . ) in LCMR such that: (a) when the sub-activity in ZuA(AVs) is interrupted then resources Resgj will be free, (b) motsu-act(AVg,SMgi,SMgj,t) >1.35*motsu-act(AVs,SMsu,SMsw,t);
if such element ECMR(AVs) is determined then begin command Magj to interrupt the execution of the sub-activity su-act(SMsu,SMsw);
put 'interup-st' in ECMR(AVs) and update ZuA(AVs) end end;
delete EuM1(AVg) in the list LuM1 end end end;
D5. handle each foreseen situation, which just has appeared in an object in TOS and is registered in the list LS2 (built in D1.3 and D3.2), as follows:
actmamot:=max(motacty, for activities AVy in Lexint, where motacty is in ZuA(AVy) and denotes the motivation to execute the activity AVy);
for each element ES2(Q)=(Q,M(Q),(as1,Sa1,SMa1,.,.), . . .,(ask,Sak,SMak,.,.)) in LS2 (s. (5.1)) do begin for each situation SMae in ES2(Q) do begin
if SMae belongs to a situation sequence, FSh, in Q then register in FSh that SMae has appeared;
AK1:={AVy is in AK(SMae) (s. Sect. 3.1)|activity AVy is in one of the following lists LA1, . . . ,LA4 in object model M(Q) (s. Sect. 2.2): ('ex-act',.,.,LA1, . . . ), ('use-act',.,.,LA2, . . . ), ('act-in',.,.,LA3, . . . ), ('act-rem', .,.,LA4, . . . )};
acf:=true; while AK1≠∅ and acf=true do begin choose activity AVp, from AK1, with the greatest motivation, motactp, determined by the operation mot(aS,SMae,AVp,t,motactp,pg,SMg,t2,art,zvp) (s. Sect. 3.1);
if motactp>0.25*actmamot then begin
if resources for execution of the activity AVp are available then begin acf:=false;
put the element ('ac-sit',SMae,AVp,.,.) in the list LAst and delete (ase,Sae,SMae, . . . ) in ES2(Q)
end else begin search for activities AVx1, . . . ,AVxr, in the lists PAH and LCMR, such that: (a) if the sub-activities in ZuA(AVxi), i≦r, are interrupted then the resources for execution of the activity AVp will be free, (b) motactp>1.3*motactxi, for i=1, . . . ,r, where motactxi is in Zua(Vxi) and denotes the motivation to execute activity AVxi;
if such activities AVx1, . . . ,AVxr are determined then begin put ('ac-sit',SMae,AVp, . . . ) in the list LAst and delete (ase,Sae,SMae,.,.) in ES2(Q); acf:=false end else delete AVp in AK1 end end else acf:=false end end end;
D6. handle not foreseen situations which just have appeared in structured objects, Q, in TOS and are registered in the list LnexS (s. D1.5) as follows:
actmamot:=max(motacty, for activities AVy in Lexint, where motacty is in ZuA(AVy) and denotes the motivation to execute the activity AVy);
for each element EnexS(Q)=(Q,M(Q),(as1,Su1,SMu1,.,.), . . . ,(ass,Sus,SMus,.,.)) in LnexS do begin
for each situation (Sui,SMui) in EnexS(Q) do if |rosa (aS,SMui,t)|>500 then inform: "unexpected situation (Sui,SMui) has appeared in object Q";
Ene1:=EnexS(Q); acs:=true; Aa:=∅; while acs=true do begin
AKU:={AVrj a situation SMure in En1 is initial situation of the activity AVr, and AVr is not in Aa and occurs in the list ('act-in',.,.,LA3, . . . ) or ('act-rem',.,.,LA4, . . . ) occurring in object model M(Q) or clo(M(Q)));
if AKU≠∅ then begin choose activity, AVg, from AKU, with the greatest motivation, motactg, determined by the operation mot(aS,SMuge,AVg,t,motactg,px,SMx, t2,art,zvg) (s. Sect. 3.1);
if motactg>0.2*actmamot then begin
if resources for execution of the activity AVg are free then begin Aa:=Aa∪(AVg);
put the element ('ac-sit',SMuge,AVg,.,.) in the list LAst, to execute AVg, and delete (ase,Suge,SMuge, . . . ) in Ene1 end else
begin search for activities AVx1, . . . ,Avxd, in the lists PAH and LCMR, such that: (a) if the sub-activities in ZuA(AVxi), i≦d, are interrupted then the resources for execution of the activity AVg will be free, (b) motactg>1.2*motactxi, for i=1, . . . ,d, where motactxi is in Zua(Vxi) and denotes the motivation to execute activity AVxi;
if such activities AVx1, . . . ,AVxd are determined then begin Aa:=Aa∪(AVg);
put ('ac-sit',SMuge,AVg, . . . ) in the list LAst, and delete (ase,Suge,SMuge,.,.) in Ene1, end else Aa:=Aa∪(AVg) end end else acs:=false end else acs:=false end end;
D7. handle objects and situations, in the list LOSf (with elements EOSf(Q), s. D1.6), which have not appeared in structured objects in TOS, although they should be there now, as follows:
actmamot:=max(motacty, for activities AVy in Lexint, where the motivation motacty is in ZuA(AVy));

for each element EOSf(Q)=(QM(Q), ob (pr(Of1),M(Of1)), . . . ,(pr(Ofa),M(Ofa)); sit (pr(Sf1),SMf1), . . . , (pr(Sfd),SMfd)) in LOSf do begin build the following situations:
  SOfi:=object M(Ofi) is not appeared in object Q although it should be there now with probability pr(Ofi), for i=1, . . . ,a;
  SMFe:=situation SMfe is not appeared in object Q although it should be there now with probability pr(Sfe), for e=1, . . . ,d;
increase the attention to situations SOfi, i=1, . . . ,a, and SMFe, e=1, . . . ,d, according to the relevant rules given in [AS6]; apply the relevant rules, given in Sect. 2.1, in [AS6] and in [AS5], to update the relevant values bet(aS,b,t), des(aS,b,t) and other emotion intensities, with respect to the appeared situations SOfi, i=1, . . . ,a, and SMFe, e=1, . . . ,d;
WSF:={SF|SF=SOfi, i≦a, and |rosa(aS,SOfi,t)|>10 or SF=SMFe, e≦d, and |rosa(aS,SMFe,t)|>10} (situations which are not in WSF are unimportant for aS);
for each situation SF in WSF do if |rosa(aS,SF,t)|>500 then inform: "situation SF has arisen";
A1:={AV|ZuA(AV) is in the list Lexint or AV is in LAst and the execution of the activity AV began or begins from a situation in WSF};
acs:=true; while acs=true do begin
AKF:=(AVf|a situation SFj in WSF is initial situation of the activity AVf and AVf is not in A1 and occurs in one of the following lists ('use-act',.,.,LA2, . . . ), ('act-in', .,.,LA3, . . . ), ('act-rem',.,.,LA4, . . . ) occurring in object model M(Q) or clo(M(Q))};
if AKF≠Ø then begin choose activity, AVg, from AKF, with the greatest motivation, motactg, determined by the operation mot(aS,SFgi,AVg,t,motactg,px,SMx,t2, art,zvg) (s. Sect 3.1);
if motactg>0.3*actmamot then begin
if resources for execution of the activity AVg are available then begin A1:=A1∪(AVg);
  put the element ('ac-sit',SFgi,AVg,.,.) in the list LAst, to execute AVg, and delete the situation SFgi in WSF end else begin
  search for activities AVx1, . . . ,AVxd, in the lists PAH and LCMR, such that (a) if the sub-activities in ZuA(AVxi), i≦d, are interrupted then the resources for execution of the activity AVg will be available, (b) motactg>1.3*motactxi, for i=1, . . . ,d, where motactxi is in Zua(Vxi) and denotes the motivation to execute activity AVxi;
if such activities AVx1, . . . ,AVxd are determined then begin A1:=A1∪(AVg);
  put ('ac-sit', SFgj,AVg, . . . ) in the list LAst and delete SFgj in WSF end else
A1:=A1∪(AVg) end end else acs:=false end else acs:= false end end.

References

[InL] M. d'Inverno, M. Luck: Understanding agent systems; Springer-Verlag Berlin Heidelberg (2001).

[MeA] A. M. Meystel, J. S. Albus: Intelligent systems: architecture, design and control; John Wiley & Sons, New York (2002).

[JMü] J. P. Müller: The design of intelligent agents, a layered approach; Lecture notes in artificial intelligence, Vol. 1177, Springer-Verlag Berlin Heidelberg, (1996).

[AS1] A. Schurmann: An Example of a motivated Agent; (15 pages), (1998).

[AS2] A. Schurmann: Cooperation in a motivated, Behaviour based Multi-Agent System; (16 pages), (1998).

[AS3] A. Schurmann: A simple thinking artificial Servant; (48 pages), (1998).

[AS4] A. Schurmann: An idea how to define Semantics for a simple natural Language; (48 pages), (1999).

[AS5] A. Schurmann: Darstellung von Emotionen in elektronischen Geräten; international Patent Application No. PCT/DE00/03210; WIPO, Internation. publication number WO 02/23474 A2. March 2002; English translation "Representation of emotions in electronic devices" is submitted to United States Patent and Trademark Office (March 2002), U.S. application Ser. No. 10/089,369

[AS6] A. Schurmann: Determination der Befriedigung und des Verlangens in virtuellen Wesen; international Patent Application No. PCT/DE01/01416; WIPO, Internation. publication number WO 02/084589 A1, October 2002; English translation "Determination of satisfaction and desire in virtual creatures" U.S. Pat. No. 6,782,341 B2; Aug. 24, 2004.

What is claimed is:

1. A method for determination and control of activities of a non-biological emotional system, denoted by aS, said system comprising: (i) a subsystem, denoted by WP, for perception of objects and situations, (ii) a set of needs, (iii) rules and procedures for determining emotional intensities, and (iv) models of objects and situations which can occur in the surrounding of the system aS, where to such model can be connected stimulus patterns with respect to said needs, said method, comprising:

(a) a set of activity schemas, or in short activities, which the system aS can execute and which include said in (iv) situation models some of which are initial and end situations of the activity, and some of the end situations are goal situations;

(b) determining the activity which handles a situation currently perceived and which is not an expected situation of an activity being executed or interrupted, putting this activity with this situation into the list of activities waiting for execution, and updating the emotional intensities depending on said perceived situation using said in (iii) rules and procedures;

(c) intensities of satisfactions and desires with regard to said in (ii) needs, and other emotional intensities of the system aS, where these intensities are updated by using said in (iii) rules and procedures;

(d) associating to each currently perceived situation the activity which is being executed or interrupted, when this situation is expected in this activity at present;

(e) associating to each command currently perceived the activity which accomplishes this command and the actual initial situation of this activity, and putting this command with the associated activity and said initial situation into the list of activities waiting for execution;

(f) determining the execution of activities and commands waiting for execution by means of the present motivations of the system aS to execute these activities and commands;

(g) updating the intensities of satisfactions and desires and other emotional intensities of the system aS with regard to the needs occurring in the stimulus patterns which are in the achieved or not achieved end situation of the activity which has been finished or abandoned; and (h) updating the intensities of satisfactions and desires of the system aS with regard to the need to perform commands and wishes of an authorized person or system, and the need for recognition and acknowledgement, when a command has been finished or abandoned.

2. The method according to claim 1 wherein the present motivation of the emotional system aS to execute an activity is determined by stimulus intensities of the end situations of this activity at the present time and in the future, wherein a stimulus intensity of a situation is determined by stimulus patterns connected with this situation, where a stimulus pattern shows the changes of satisfaction and desire intensities with regard to the need connected with this stimulus pattern in a period of time, and the intensities of satisfactions and desires of the systems aS at the present time and in the future with regard to the needs which are connected with said stimulus patterns.

3. The method according to claim 1, wherein the present motivation of the emotional system aS to execute a command is determined by the motivation of the system aS to execute the activity which accomplishes this command, and the intensities of satisfactions and desires of the system aS with regard to the need to perform and fulfil the commands and wishes of an authorized person or system, and the need for recognition and acknowledgment.

4. The method according to claim 1, wherein an activity schema, or in short activity, contains a connected graph, wherein:

the nodes are said in claim 1 situation models, or in short situations, wherein some of these situations are initial or end situations of the activity and some end situations are goal situations, and to each end situation is connected at least one stimulus pattern with respect to a need of the system aS;

to each arc is associated a sub-activity, which specifies the actions and operations which should be executed to achieve the next node/situation of the sub-activity, wherein the motivation to execute a sub-activity is determined by the stimulus intensities of the end situations of the activity, and sub-activity includes a control-activity if this sub-activity should be executed not by the system aS but by an other object.

5. The method according to claim 4, wherein determining and controlling the execution of activities waiting for execution comprising the steps of choosing from the list of activities waiting for execution the activity with the maximum motivation to execute its current sub-activity, and interrupting the execution of the sub-activity which is being executed and continuing the execution of the chosen sub-activity with the greatest motivation, if this motivation is greater than the motivation to execute the sub-activity being executed till now.

6. The method according to claim 4, wherein controlling the execution of a sub-activity by an other object comprising a control-activity connected with said sub-activity comprising situation models for expected situations which can appear when this sub-activity is executed by said object, and elementary activities/operations, especially an observation activity, which the emotional system aS executes;

a motivation of the system aS to execute said control-activity where this motivation is determined by the duration of the execution of this sub-activity after the last execution of the control-activity by the system aS, and the motivation to execute the sub-activity in which said control-activity occurs;

executing said elementary activities/operations to recognize whether a new said expected situation appeared;

and executing said elementary activities/operations to correct or abandon the execution of this sub-activity by said object, if said appeared situation shows that the execution of this sub-activity is not optimal or wrong.

7. A method for perception of objects and situations, which specify said perception subsystem WP of the emotional system aS of claim 1, comprising:

focusing the observation activity of the system aS on these objects and situations, in the actual surrounding of the system aS, for which aS, at present time, has high intensities of desires for attention and curiosity/knowledge;

building an internal representation of the currently identified surrounding by means of a tree, wherein:

each node of the tree represents an actually recognized object, the successors of a node are the recognized objects which are at present in the object represented by said node, and recognized situations which are actually in an object are registered in the node representing this object; and identifying objects and situations by means of a directed graph which represents the structures and relations of the object and situation models in the world of the emotional system aS, where the nodes of the graph are, said in (iv) of claim 1, object and situation models.

* * * * *